United States Patent [19]
Griner

[11] 3,857,331
[45] Dec. 31, 1974

[54] METHOD OF AND APPARATUS FOR MAKING WAFERS

[75] Inventor: Arthur J. Griner, Wyckoff, N.J.
[73] Assignee: Nabisco, Inc., New York, N.Y.
[22] Filed: Sept. 19, 1972
[21] Appl. No.: 290,329

[52] U.S. Cl............... 99/373, 99/389, 99/391
[51] Int. Cl............... A21b 5/02, A47j 37/01
[58] Field of Search........... 99/349, 372, 373, 374, 99/450.3, 450.4, 389, 390–391, 393; 100/DIG. 10, 268; 214/1 BV

[56] References Cited
UNITED STATES PATENTS

| 973,304 | 10/1910 | Ribe................... | 99/374 X |
| 1,264,591 | 4/1918 | Atkinson............... | 99/373 X |
| 1,628,310 | 5/1927 | De Roos................ | 99/374 X |
| 2,116,688 | 5/1938 | Ratliff................ | 99/374 |
| 2,596,278 | 5/1952 | Naylor et al........... | 99/374 X |
| 2,745,363 | 5/1956 | Balton................. | 99/373 X |
| 2,823,786 | 2/1958 | Grogg.................. | 99/373 UX |
| 3,121,385 | 2/1964 | Funke et al............ | 99/374 |
| 3,348,503 | 10/1967 | Beik et al............. | 99/450.4 |
| 3,377,942 | 4/1968 | Carbon................. | 99/374 X |
| 3,587,888 | 6/1971 | Warren................. | 214/1 BV X |

FOREIGN PATENTS OR APPLICATIONS

| 28,129 | 1/1903 | Switzerland............. | 100/268 |

Primary Examiner—Robert L. Bleutge
Assistant Examiner—Arthur O. Henderson
Attorney, Agent, or Firm—I. Allen Strombeck

[57] ABSTRACT

Wafers are baked between electrically-heated separable platens constituting stationarily positioned platen sets or molds disposed in two opposed parallel banks, the two banks containing the same number of molds, corresponding molds in the two banks being aligned. Each bank of molds is served by its individual batter carriage which reciprocates longitudinally of such bank, the carriage carrying a plurality of longitudinally spaced batter-dispensing mechanisms and valves. In one cycle of operation of a particular bank of molds the batter dispensers and valves move in an operative stroke across their molds in one direction to a first terminal position beyond the molds, and in the succeeding cycle the batter-dispensers and valves move in an operative stroke across their respective platen sets in the opposite direction to a second terminal position beyond the other end of the platen sets.

The apparatus includes control means whereby when the platen sets in one bank are baking their wafers, the platen sets in the other bank are being opened, having the baked wafers removed therefrom, and being provided with fresh batter preparatory to their closing and and beginning their own new bake cycle. The platen sets of the two banks thereof are served by a single set of vacuum pick-up heads which, at the proper time, move from their central inoperative position in between the opened platens of one bank, are lowered into substantial contact with the baked wafers produced by such bank, are raised to lift the wafers, are returned to the central position, the vacuum then being cut-off to the vacuum heads whereby to drop the baked wafers onto a conveyor disposed therebeneath.

47 Claims, 25 Drawing Figures

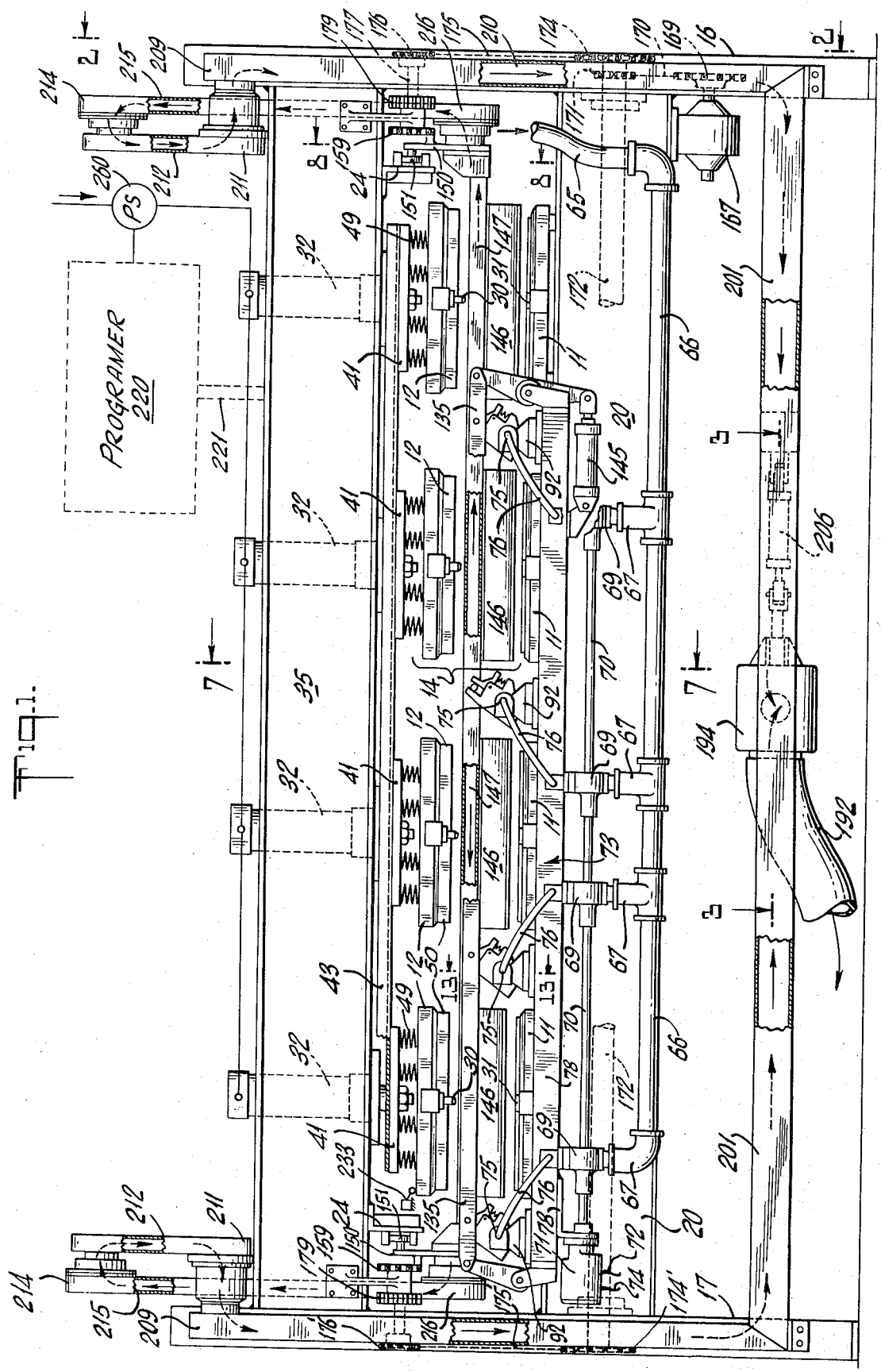

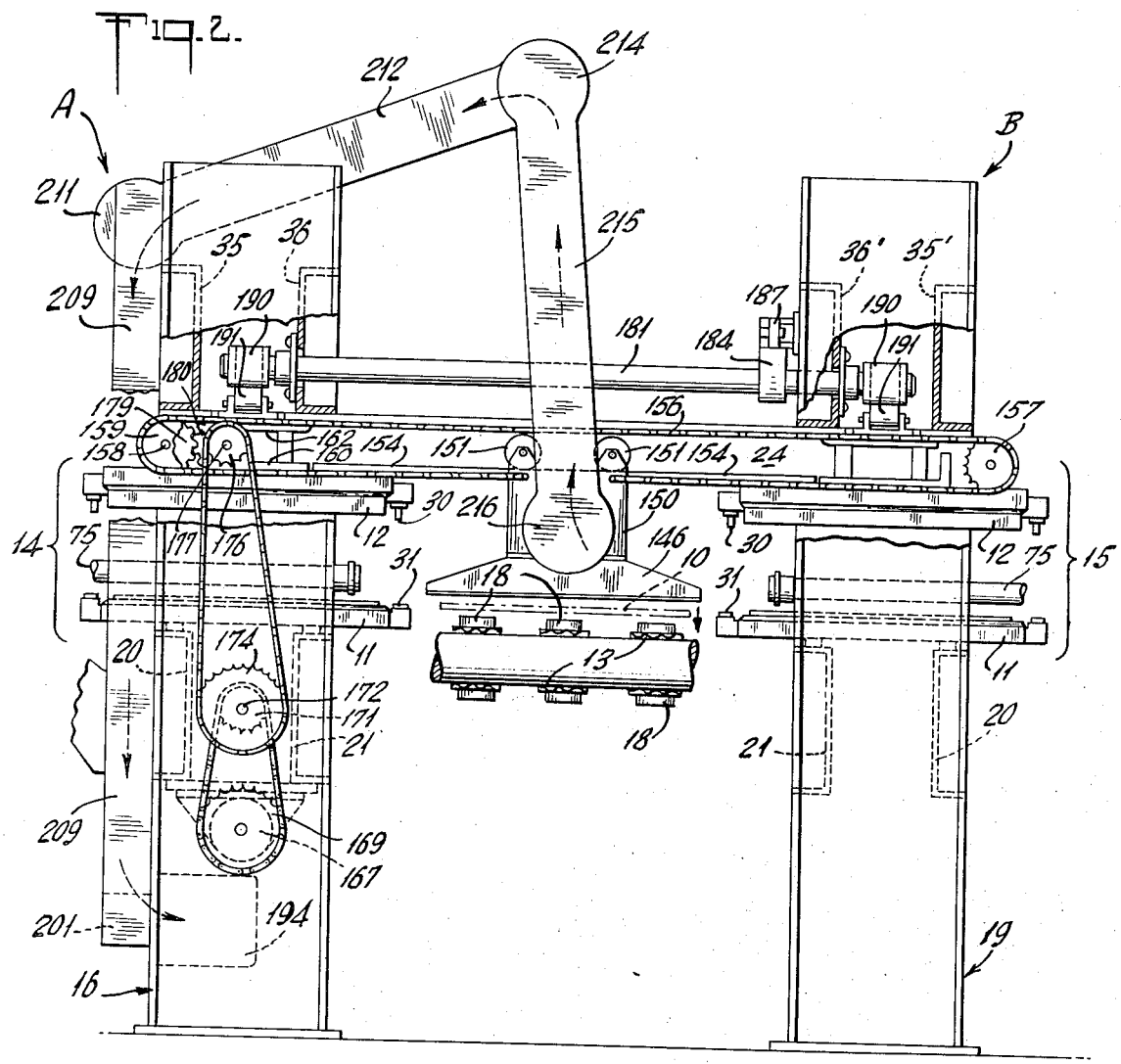

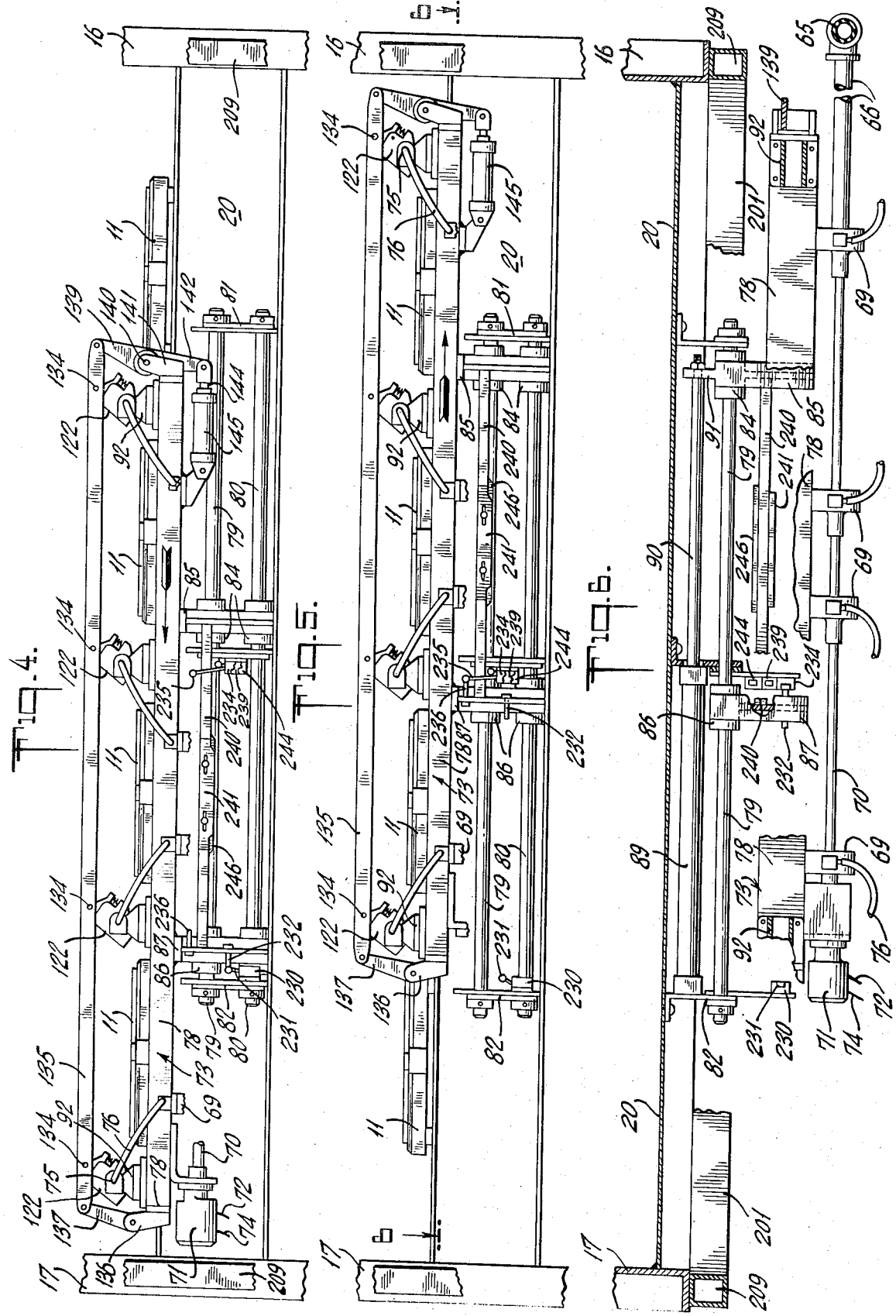

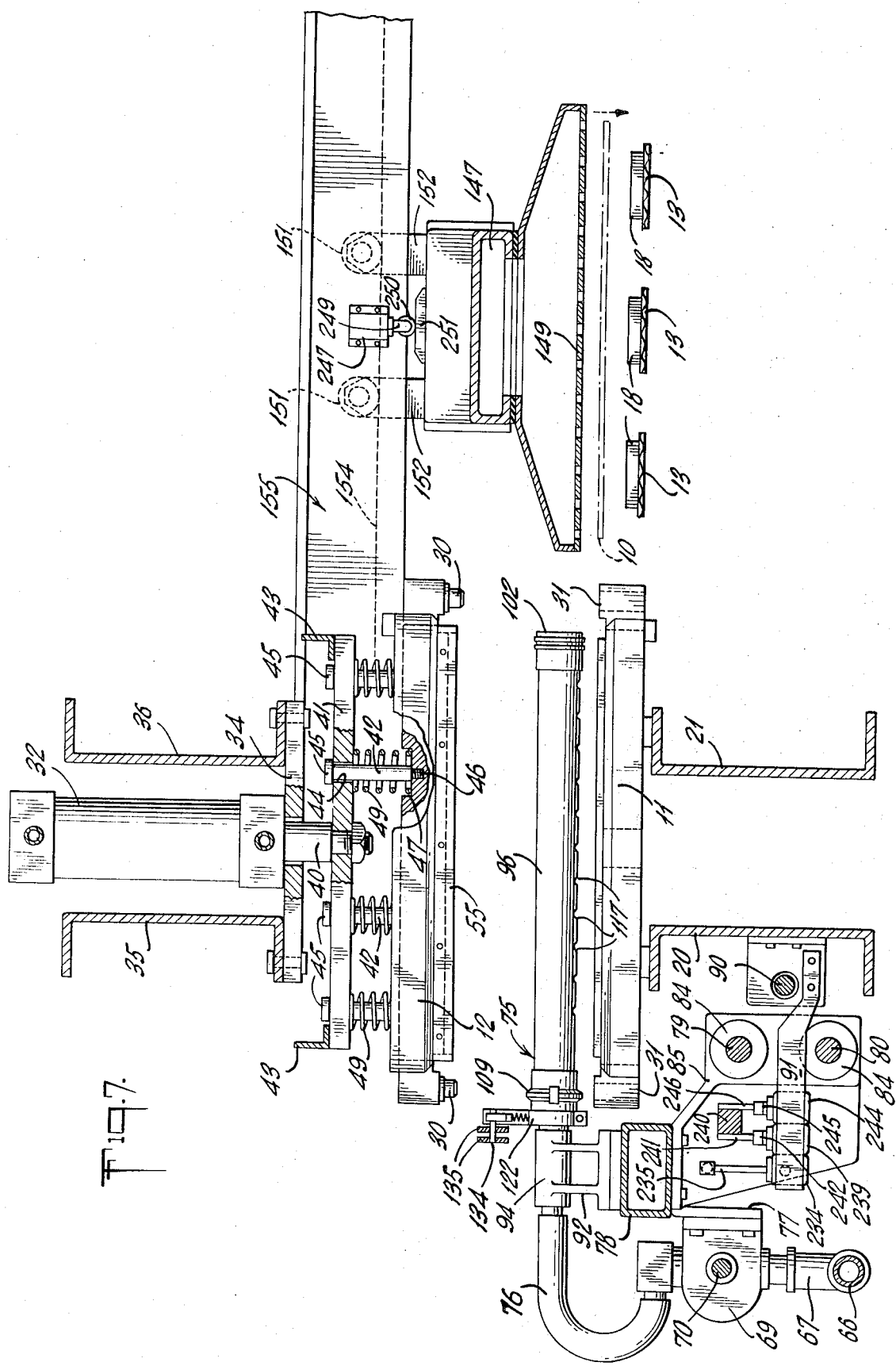

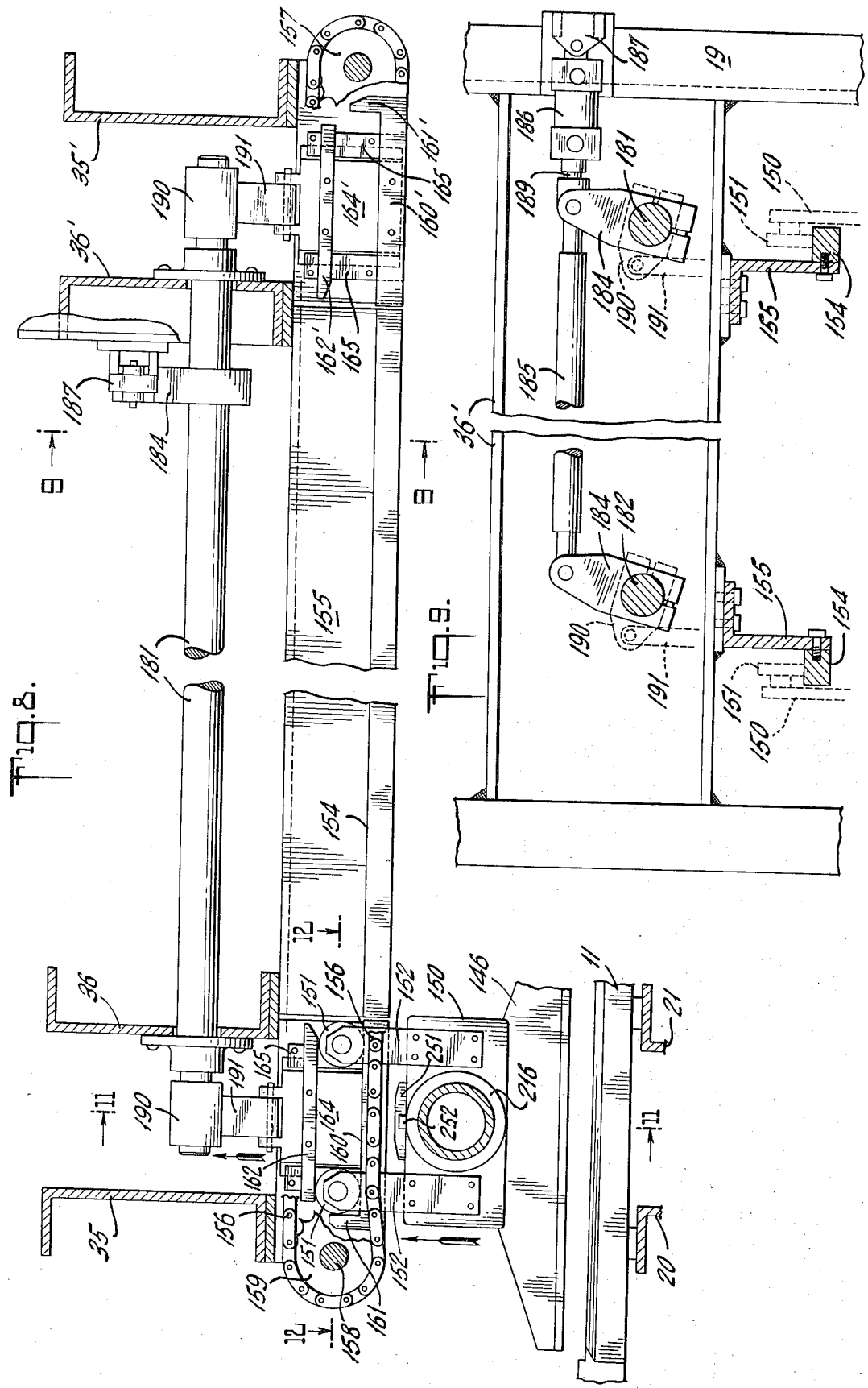

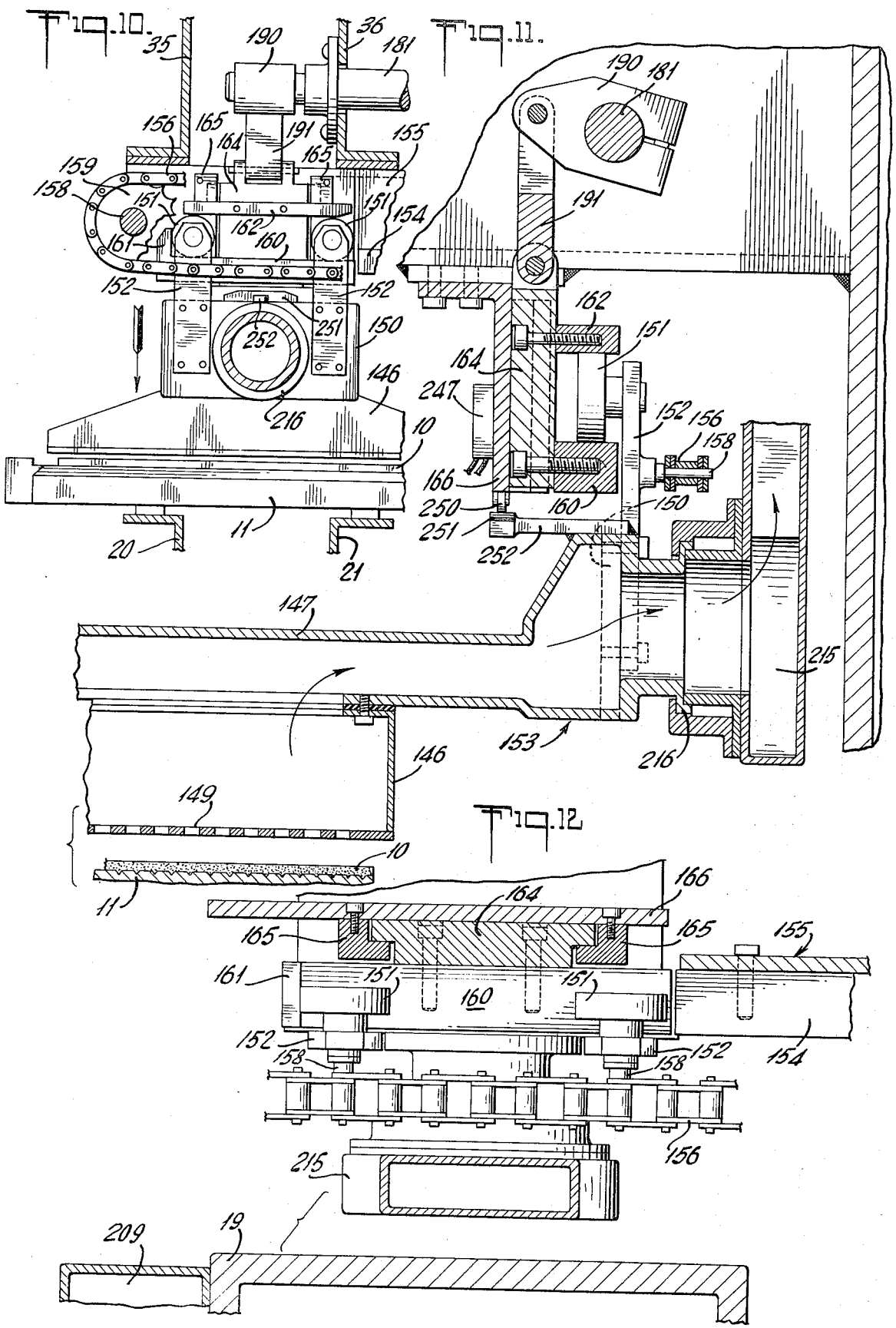

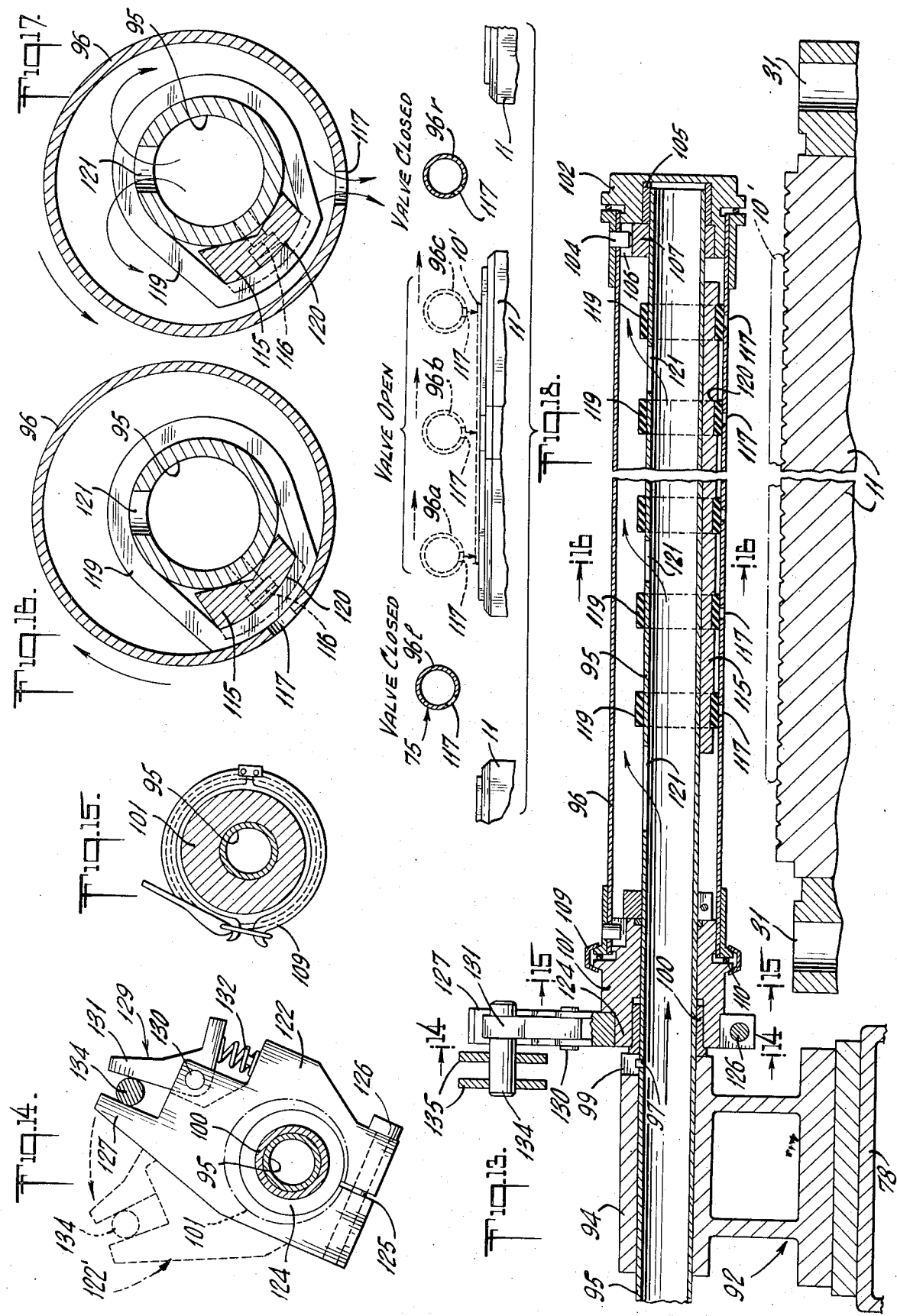

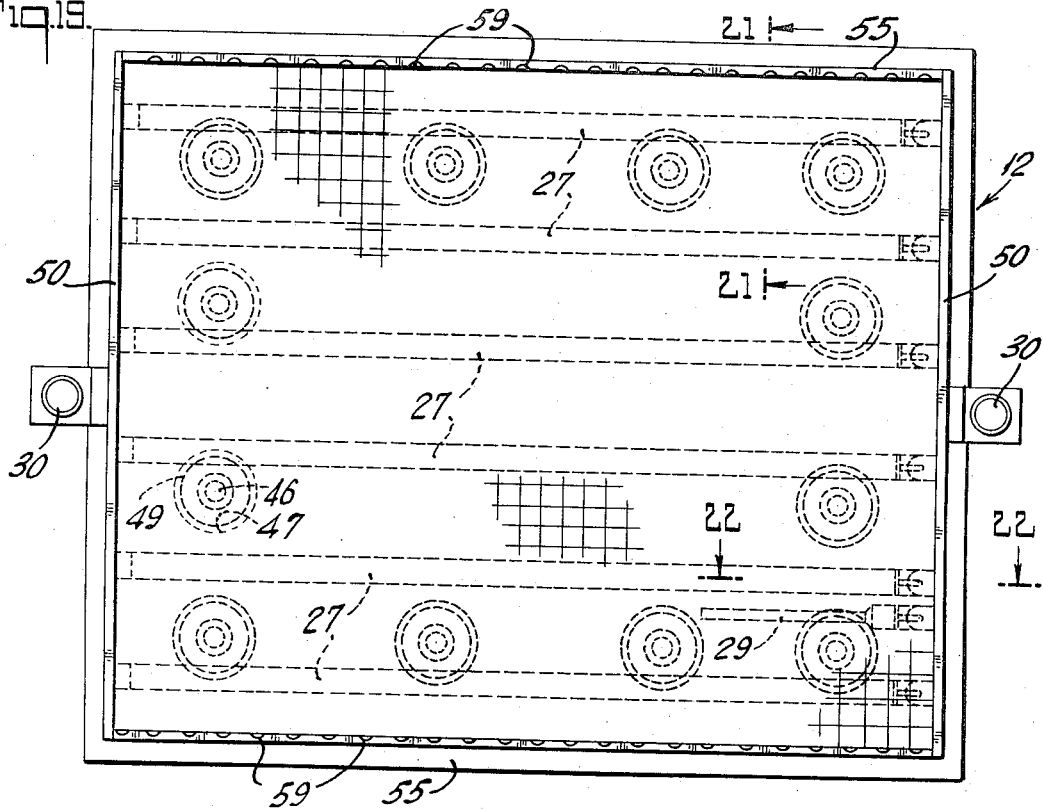
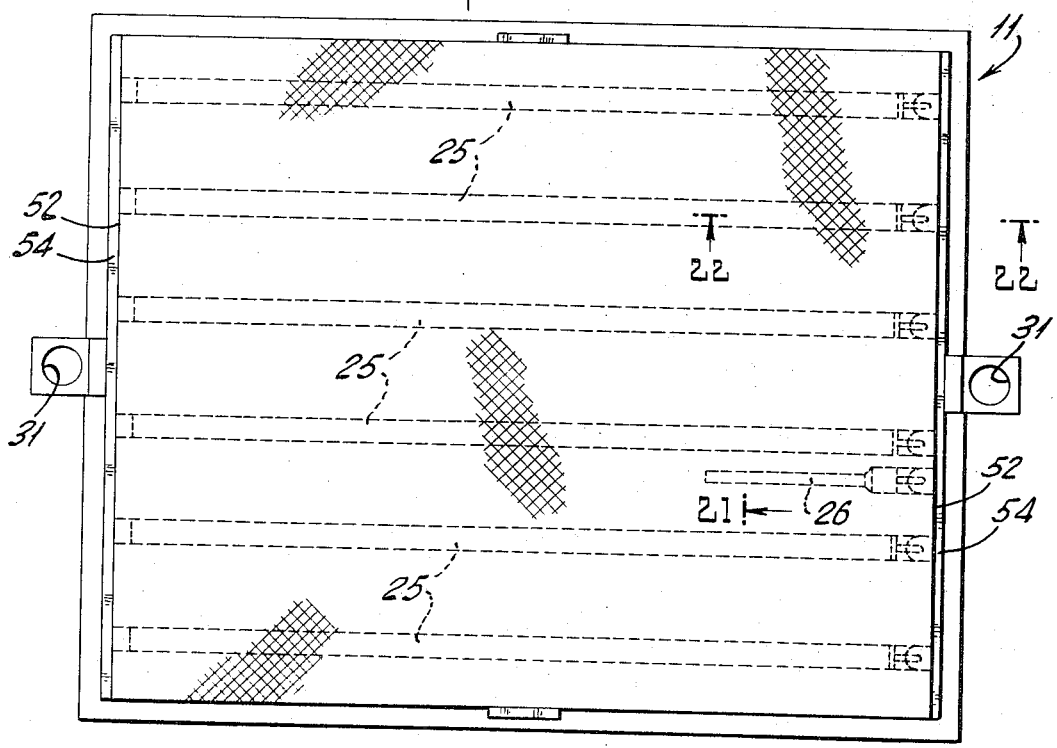

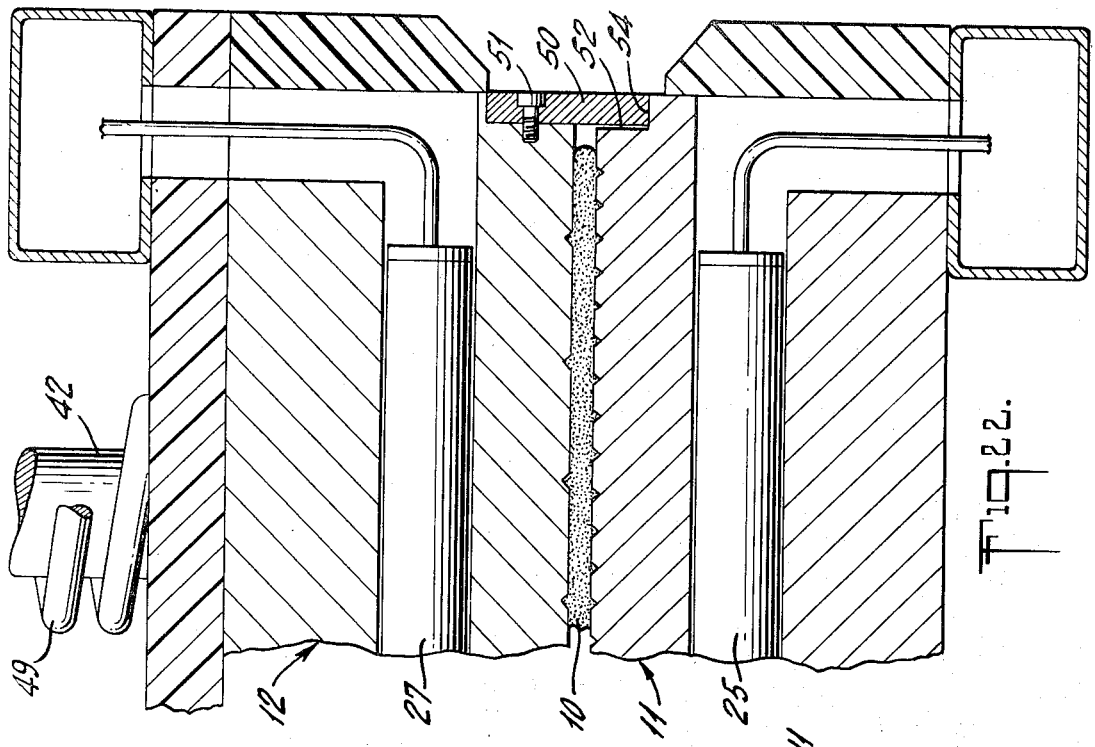
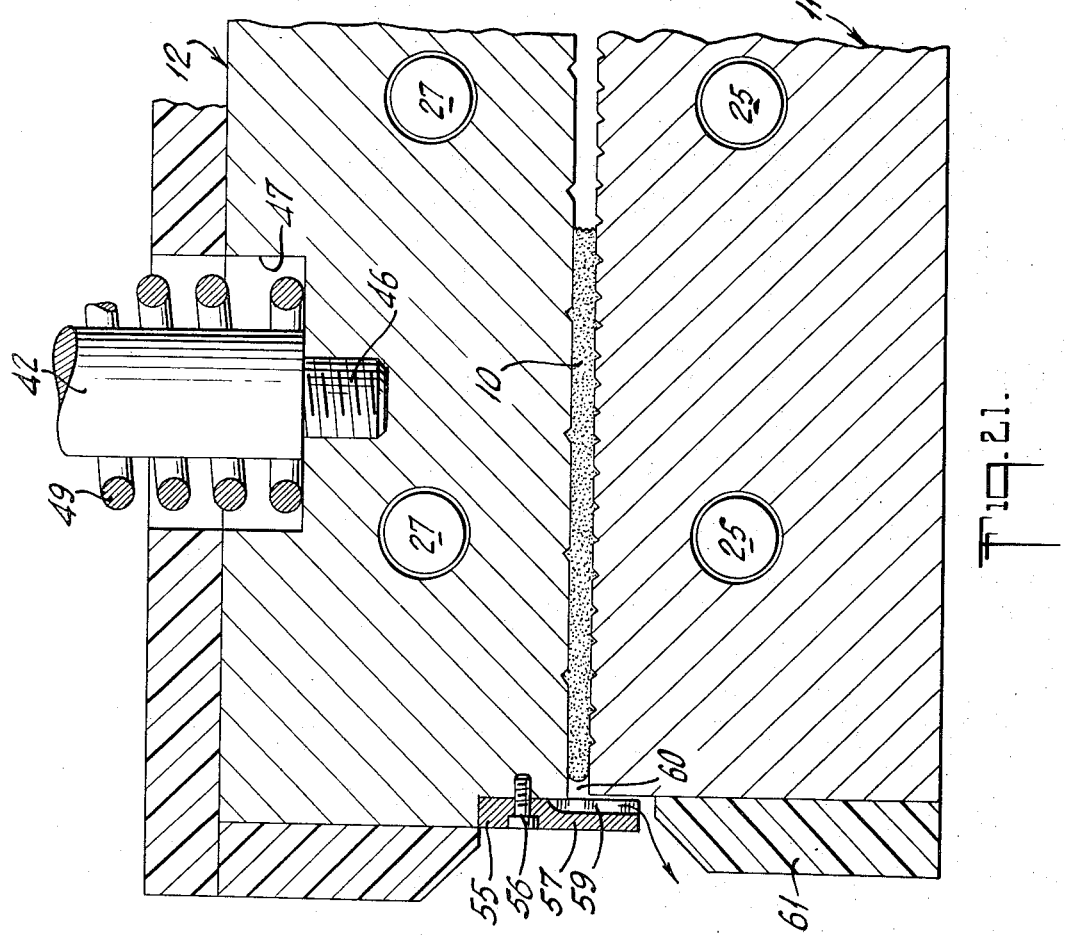

METHOD OF AND APPARATUS FOR MAKING WAFERS

This invention relates to a method of and an apparatus for automatically baking wafers and the like.

DESCRIPTION OF THE PRIOR ART

A widely employed apparatus for making wafers of the type made by the apparatus of the present invention is shown generally in U.S. Pat. No. 990,577 to Mayle, et al. Such prior apparatus employs a gas-fired oven which is fully three times as long as the present apparatus and almost as wide. Through the oven there extends a continuously driven chain having spaced upper (operative) and lower (return) longitudinally extending runs, the chain carrying a series of platen sets, a platen of each set being affixed to the chain and the second platen of the set being hinged to the first platen along one side thereof. At the entering end of the oven, where the upper run of the chain starts its travel through the oven, a measured amount of batter is deposited upon the lower platen of each of the then-opened platen sets, following which the upper platens are sequentially swung downwardly to close the platen sets. The upper platen of each set is forcibly held closed while the platen sets travel through the oven toward the other, wafer discharge, end thereof. At a station adjacent such discharge end of the oven, the upper platens are sequentially swung into open position, and the baked wafers are discharged from their lower platens by jets of air directed against the wafers from ports in the lower platens, such ports being spaced over the platen area.

The above-described prior wafer-making apparatus has a number of serious disadvantages. The oven requires a very substantial amount of space, and despite its insulation, heats the surrounding environment to a quite substantial extent. It is inefficient, the heating of the environment causing a substantial waste of energy, and requires a substantial amount of power to drive the platen-carrying chain in the oven. Because of the length of travel which is necessary to complete the baking cycle of the product, it is difficult to maintain the temperature of the oven substantially uniform throughout its extent. The service to which the parts of the apparatus is exposed is rigorous, because of the elevated temperature at which the moving parts must operate. Such apparatus is also difficult to service because of the fact that most of its parts are at elevated temperature, and also because most of them are mounted within the oven-forming enclosure.

Possible space and power limitations impose limitations upon the length and breadth of the wafers, or more properly, wafer "books," produced by the apparatus. Thus the upper platens, which are swung into open position along one edge, are of substantial weight and require appreciable amounts of power to swing them open. Such swinging of the upper platens also requires that the oven be tall enough to receive the upper platens in opened, upright position. The size of the product is also limited by the manner in which the wafer books are removed from the lower platens, since the jets of air employed for this purpose subject them to very substantial stresses which frequently lead to their breaking, particularly at their corners.

The method and apparatus of the present invention possess very substantial advantages over those of the prior art. These include economy of size, as pointed out above, and also economy of heat, since only the platens are heated. Working conditions about the apparatus are pleasant, since it does not substantially heat the environment, and all of the parts of the apparatus, except for the platens, remain at substantially ambient temperature.

A very substantial advantage of the apparatus of the invention is the fact that the baking heat is supplied by electrical resistance heating rather than by the burning of gas. At the present time there is a substantial shortage of natural gas, and efforts are being made to dissuade industry as well as home-owners from using natural gas in industry and in the heating of houses. Electrical resistance heating is much more readily and exactly controlled than gas heating; in the present apparatus the temperature of the upper and lower platens of each platen set is controlled separately, which is not possible in the prior art where the two platens of each platen set run through the same heated environment of a gas-fired furnace. There is much less wear and tear on the moving parts of the apparatus of the present invention, since almost all of them are operated at ambient rather than elevated temperature.

The apparatus of the present invention is easy to service, because the wafer-forming platens are visible at all times. Parts of the apparatus other than the platens can be worked upon at any time without requiring them to cool. The size of the product produced by the present apparatus is not subject to the limitations which restrict the size of the product produced in the prior apparatus. Thus, in a preferred embodiment of the apparatus of the present invention, which is to be fitted into production lines including older, gas-fired ovens as above-described, the wafer books are of twice the width of those produced by the gas-fired ovens, the product of the present apparatus then being sawed in two to present a product which is of the same size as that produced in the other, gas-fired installations. Finally, the apparatus of the present invention produces a product which is much more perfect than that possible in the described prior art installations. The double-sized books are removed from the lower platens by vacuum heads which are lowered into contact with the wafer books, which subject the product to vacuum to lift them with the vacuum heads, and to move them laterally with the heads. The cutting off of the vacuum to the vacuum heads then releases the wafer books, which are deposited gently upon a moving conveyor disposed therebeneath.

The invention has among its objects the provision of a novel improved method of baking wafers and the like including the manner of dispensing batter to molds or platen sets, and the manner of removing baked wafers from the platen sets.

Another object of the invention resides in the provision of wafer-baking apparatus including novel mechanism for dispensing batter upon the bottom platen of a two-platen mold and novel mechanism for removing baked wafers from the open platens of a platen set upon the completion of the baking cycle thereof.

SUMMARY OF THE INVENTION

In the specific embodiment of the apparatus disclosed herein, platen sets or molds are disposed in two opposed banks, each bank including the same number of platen sets, the platen sets in the opposed banks being aligned. The platen sets are stationarily mounted in the apparatus, and the opposed platens are electrically heated. Each bank of platen sets or molds is served by its individual batter carriage upon which are mounted a plurality of longitudinally spaced batter-dispensing and valve mechanisms each of which services its respective platen set upon each stroke of the reciprocable batter carriage, thereby saving time in the operation of the apparatus and increasing its production. The two banks of platen sets or molds are spaced from each other a distance suffficient to receive a conveyor therebetween and also a plurality of laterally movable vacuum pick-up heads which alternately service the opposed aligned platen sets in the respective banks thereof. The two banks of platen sets operate on time cycles which may be said to be diametrically opposed: Thus, while one bank of platen sets is baking its product, the platen sets of the other bank are being opened, the vacuum head is being traversed to a position between the open platens and is then lowered to pick up the baked wafers. Thereupon, the vacuum heads are energized and then raised, carrying with them the wafers; the vacuum heads are then moved into their central postion above the conveyor. A signal from a micro-switch associated with the conveyor, indicating that the pocket-defining lugs on its belts are in the correct position, closes the vacuum valve, thereby cutting off vacuum to the pick-up heads to deposit the wafers upon the conveyor. The still open platens of the last-named bank are now serviced to be provided with batter by the batter-dispensing and valve mechanisms, which then pass on beyond the ends of the platens and remain there during the baking cycle of such bank and until the platens of the platen sets thereof are again opened at the end of such baking cycle.

The wafer-baking apparatus of the present invention displays great advantages over the prior art including greater production of wafers, perfection of the product, ease of control and servicing, longevity of its parts, and the fact that it adds but little heat to the environment in which it is operated.

The above and further objects and novel features of the invention will more fully appear from the following description when the same is read in connection with the accompanying drawings. It is to be understood, however, that the drawings are for the purpose of illustration only, and are not intended as a definition of the limits of the invention.

In the drawings, wherein like reference characters refer to like parts throughout the several views:

FIG. 1 is a view in side elevation of an embodiment of apparatus in accordance with the invention, certain of the parts being broken away for clarity of illustration;

FIG. 2 is a view in end elevation of the apparatus with both groups of upper platens raised, as for cleaning the platens, the view being taken from the point of view of the line 2—2 of FIG. 1;

FIG. 3 is a fragmentary view in horizontal section through the vacuum valve of the apparatus, the section being taken along the line 3—3 of FIG. 1, the micro-switch associated with the conveyor for the product being shown schematically;

FIG. 4 is a fragmentary view in side elevation of the apparatus shown in FIG. 1, the view particularly showing the horizontally reciprocable batter carriage upon which the batter pumps, the batter pump-driving means, and the combined batter distributors and valves are mounted, the carriage being shown in its left-hand terminal position;

FIG. 5 is a view similar to FIG. 4, but with the batter carriage in its right-hand terminal position;

FIG. 6 is a fragmentary view in horizontal section through the apparatus, the section being taken along the line 6—6 of FIG. 5, certain of the parts being broken away for clarity of illustration;

FIG. 7 is a view in vertical section through the apparatus, the section being taken along the line 7—7 of FIG. 1;

FIG. 8 is a fragmentary view in vertical transverse section through the apparatus, the section being taken along the line 8—8 of FIG. 1, the vacuum wafer pick-up head being shown in raised position at the left-hand terminus of its travel, a portion of the parts intermediate the length of the figure being broken away for economy of space in illustration;

FIG. 9 is a fragmentary view in longitudinal section through the apparatus, the secton being taken along the line 9—9 of FIG. 8;

FIG. 10 is a view in fragmentary transverse vertical section through the apparatus, the view corresponding to the left-hand end of FIG. 8 but with the vacuum product pick-up head and the parts upon which it is suspended being shown in lowered position;

FIG. 11 is a fragmentary view in vertical longitudinal section through the apparatus, the section being taken along the line 11—11 of FIG. 8;

FIG. 12 is a fragmentary view in horizontal section through the apparatus, the section being taken along the line 12—12 of FIG. 8;

FIG. 13 is a fragmentary view in vertical transverse section taken through the axis of a batter-dispensing and valve mechanism, the section being taken along the line 13—13 of FIG. 1;

FIG. 14 is a view in vertical section taken along the line 14—14 of FIG. 13, the view particularly showing the yieldable valve-operating mechanism, such mechanism being shown in full lines in its valve-closed position and in phantom lines in its valve-open position;

FIG. 15 is a view in section through the batter-dispensing and valve mechanism, the section being taken along the line 15—15 of FIG. 13;

FIG. 16 is a view in vertical section through the batter-dispensing and valve mechanism, the section being taken along the line 16—16 of FIG. 13, the view showing the valve in closed position;

FIG. 17 is a view similar to FIG. 16 but with the valve being shown in open position;

Figures 23, 24:
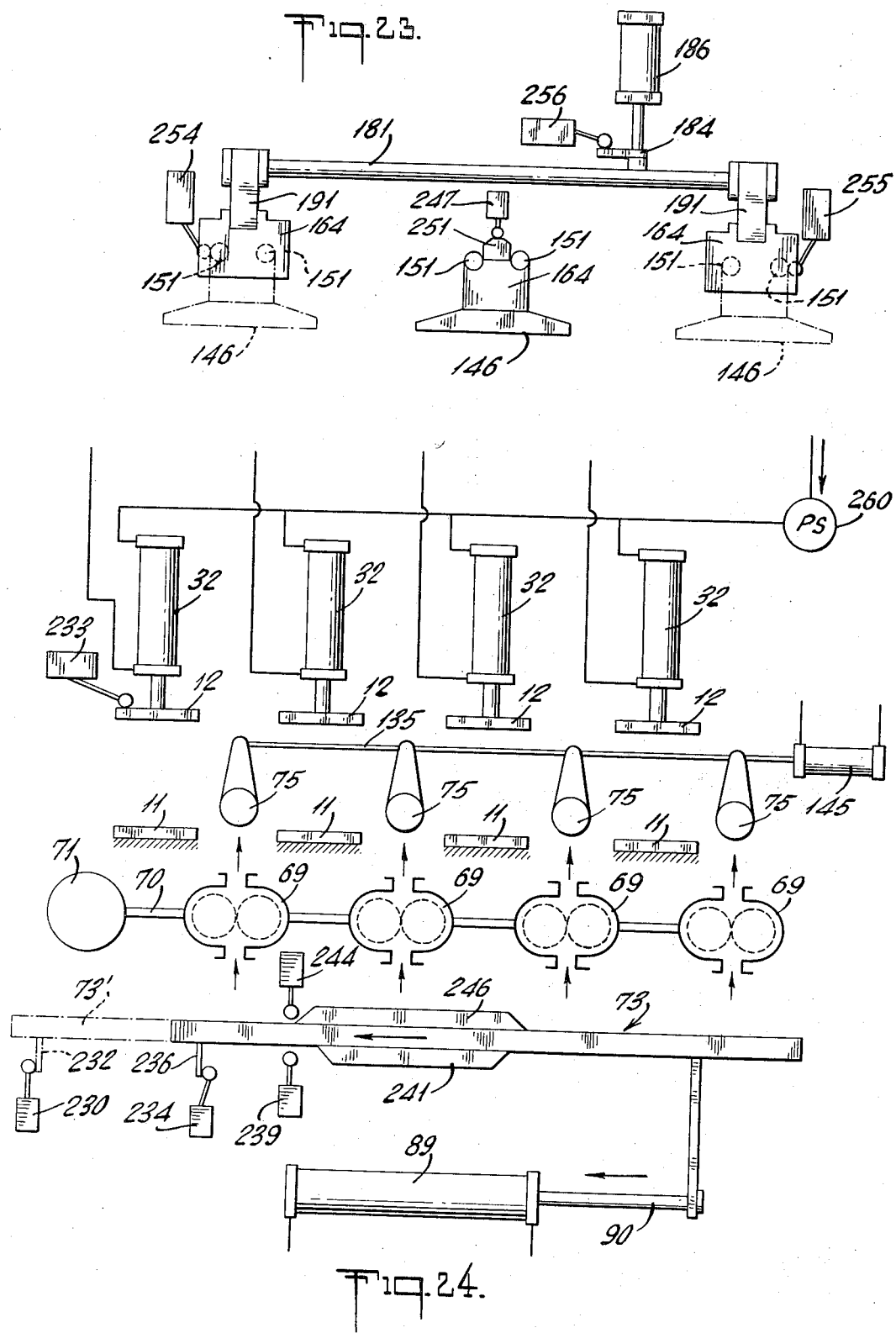
Figure 25:
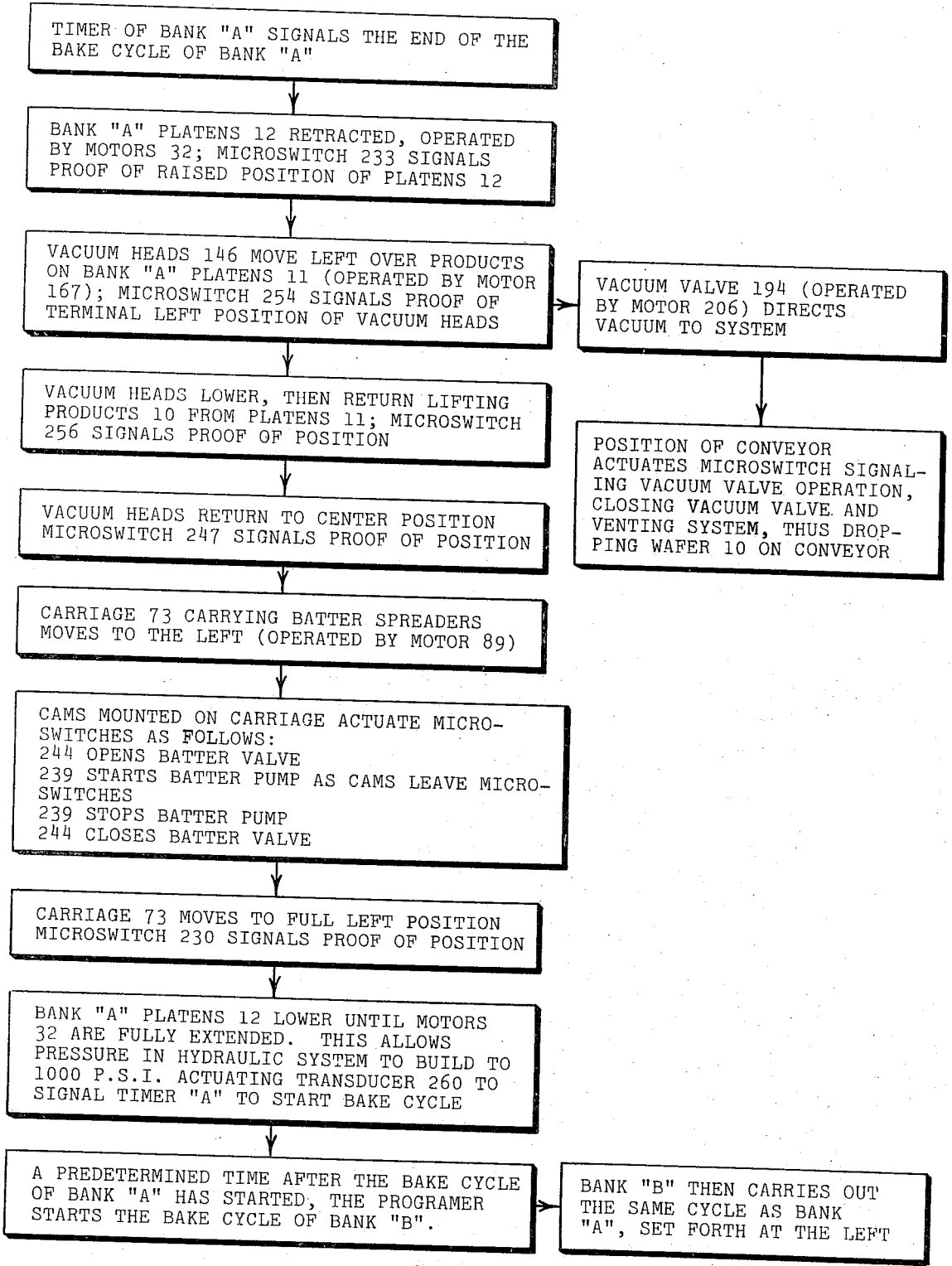

FIG. 18 is a schematic view showing a central lower platen flanked by portions of its neighboring lower platens, a batter-dispensing and valve mechanism being shown in the various closed and open positions which it assumes during its travel from its left-hand terminal position between the left-hand lower platen and the central platen there shown, and its right-hand terminal position, between the central platen and the right-hand platen there shown;

FIG. 19 is a view in bottom plan of an upper die or platen;

FIG. 20 is a view in top plan of a lower die or platen;

FIG. 21 is a fragmentary view in vertical section through an upper and lower die or platen set with the platens in their closed, operative position, the section being taken along the line 21—21 in both FIGS. 19 and 20;

FIG. 22 is a fragmentary view in vertical section through the closed upper and lower die or platen set, the section being taken along the line 22—22 in both FIGS. 19 and 20;

FIG. 23 is a schematic view of the vacuum pick-up assembly and the microswitches associated therewith;

FIG. 24 is a fragmentary schematic view of the apparatus showing the platen sets of one bank, the motors operating the movable upper platens, the batter-dispensers and valves, the batter carriage, and the microswitches and pressure switch associated therewith; and FIG. 25 is a block diagram showing the sequence of events which take place in one bank (Bank "A") of the baking press units of the illustrated apparatus during one complete cycle thereof.

GENERAL ORGANIZATION

The apparatus shown bakes "books" of sugar wafers 10 which are shown in FIGS. 2, 7, 10, 11, 12, 21, and 22. The wafer books are baked between sets of opposed fixed lower platens 11 and vertically reciprocable upper platens 12, there being four longitudinally spaced platen sets generally designated 14 in a bank "A" thereof facing the reader in FIG. 1 and disposed at the left in FIG. 2, and four platen sets 15 disposed in a bank "B" remote from the reader in FIG. 1 and disposed at the right in FIG. 2. The banks A and B of platen sets 14 and 15 are identical, and so in general the description of one such bank will suffice. The similar operating cycles of the banks "A" and "B" of the baking platens are diametrically opposed, that is, while the platens in sets 14 are closed and baking wafers, the platens in sets 15 are being opened, having the baked wafers removed therefrom, and being provided with fresh charges of battery preliminary to again being closed to start the baking portion of their cycle. A single set of four longitudinally spaced vacuum pick-up heads 146 serve both banks of platen sets, moving alternately in opposite directions from a central inoperative position between the banks of platen sets to enter between the separated platens of that bank thereof which has completed the baking of its wafers. The vacuum pick-up heads are then lowered close to the wafers lying on the bottom platens, a vacuum valve in the conduit means connected to the vacuum pick-up heads is opened, the vacuum heads then rise carrying with them the baked wafers, and then move laterally into their central position.

Beneath such central position of the vacuum pick-up heads there is disposed a longitudinally extending conveyor having laterally spaced conveyor belts 13. On such conveyor belts there are aligned upstanding belt lugs 18 which are longitudinally spaced through a distance which somewhat exceeds the length of the books of wafers, whereby to receive wafer books in receiving pockets. When the conveyor belts 13, which run continuously at a constant speed, have reached such position that the lugs 18 thereof lie vertically beneath the spaces between successive books of wafers 10 held by the respective vacuum pick-up heads 146, the vacuum supply to the pick-up heads is cutoff so that the books of wafers fall upon the conveyor belts in the correct position for their rear edges to be engaged by the lugs 18 on the conveyor belts. The conveyor belts forward the books of wafers to a centrally disposed slitting saw (not shown), which is not a part of the apparatus of the invention, so as to sever the four wafer books delivered from each bank of platen sets into eight wafer books of conventional size.

THE FRAME

As shown in FIG. 1, the frame for the bank of units there facing the reader has a right end frame member 16 and a left end frame member 17. Although the frame for the bank of units remote from the reader in FIG. 1 is generally similar, for clarity the end frame member for such bank, shown at the right in FIG. 2, is designated 19. The end frame members 16 and 17 are connected by lower parallel longitudinally extending channel members 20, 21 which are oppositely disposed as shown in FIG. 7. The end frame members are also connected by upper, parallel oppositely disposed channel members 35 and 36, likewise as shown in FIG. 7. The upper ends of the frames for the right and left banks of platen units are connected by a number of cross members at each longitudinal end of the frames; two such cross members are shown at 24 and 24' in FIG. 1.

PLATEN CONSTRUCTION AND OPERATION

The construction of the upper die platen 12 is shown in FIG. 19; that of the lower platen 11 is shown in FIG. 20, the two platens in closed, operative relationship being shown in FIGS. 21 and 22. As above-explained, the lower platens 11 are fixedly mounted in laterally spaced banks or rows of four upon the frame, there being a corresponding confronting vertically reciprocable upper platen 12 cooperating with each lower platen.

Turning first to FIG. 20, each of the lower platens 11, which may be made of cast aluminum, has a plurality of electrically insulating electrical resistance heaters, such as Calrods or the like, mounted within them as by being cast thereinto, the heaters being spaced so as to heat the platen uniformly. Also inserted in the body of the platen 11 is a thermocouple 26 which forms part of a thermostatic control circuit for the platen. The upper platen 12, shown in FIG. 19, is of generally similar construction, there being electrical resistance heaters 27 cast therein at spaced intervals and a thermocouple 29 inserted in the body of the platen and forming a part of a further separate circuit for controlling the temperature of the upper platen.

The platens 11 and 12, as shown in FIGS. 19 and 20, are disposed with the outer sides thereof, for example, those facing the reader in FIG. 1, disposed at the left in FIGS. 19 and 20. Projecting laterally outwardly from the sides of the lower platen 11 are vertically apertured bosses 31 which receive depending pilot pins 30 on similarly located bosses on the sides of the upper platen 12. The pins 30 enter the apertures in the bosses 31 prior to the closing of the mold defined by the two platens, whereby to ensure their accurate alignment.

The upper platens of each bank of platen sets are simultaneously and synchronously moved downwardly into the closed position of the platens shown in FIGS. 21 and 22 and are thereafter raised, after the baking of the wafer books formed in the cavity therebetween, into the upper terminal position thereof shown in FIGS. 1 and 7 in which they remain while baked wafer books are being removed from the lower platen of the thus-opened platen sets, and during the subsequent period in which batter is being distributed over the lower platens. Each platen set is provided with a vertically disposed double-acting fluid motor 32 which is located with its vertical axis above the center of the respective upper platen.

As shown in FIG. 7, the lower end of the casing or cylinder of motor 32 rests upon and is secured to a horizontal plate 34 which in turn is secured to the lower flanges of the longitudinal frame members 35, 36. The lower end of the piston rod 40 of each motor 32 is secured to a corresponding upper platen mounting plate 41 which is disposed horizontal and parallel to the upper platen which it carries. Spaced over the area of the plate 41 and the platen 12 are a plurality of studs 42 (16 shown) extending through vertical bores in the plate 41 and having the heads 45 thereof resting upon the upper surface of such plate when the upper is raised, as shown in FIG. 7. As shown in FIGS. 7 and 21, the lower end of each stud 42 is of smaller diameter than the stud proper, so as to present a transverse shoulder between the lower portion of the stud and the main body thereof. Such lower portion is threaded, and is received in a threaded bore 46 in the upper portion of the platen 12. Surrounding the bore 36 is a smooth-walled counterbore 47 within which is received the lower end of a coil compression spring 49 which is mounted in compression between the lower end of the counterbore 47 and the lower surface of the mounting plate 41.

The springs 49 provide the mold-closing pressure between the upper and lower platens when the piston rod 40 of the motor 32 is lowered. The smooth shanks of the studs 42 have a diameter somewhat less than the bores in the plates 41 through which they extend, thereby to prevent any binding between the studs and such bores despite slight misalignments between the upper and lower platens. To ensure the raising and lowering of the mounting plates 41 and thus of the upper platens simultaneously and in synchronism, the mounting plates 41 of each bank are connected by longitudinally extending L-shaped members 43 disposed at the inner and outer side edges of the plates 41, as shown.

Upon the descent of the piston rods 42 of the motors 32, the upper platens 12 reach their lower terminal position in which they are spaced a predetermined distance from the lower platens, whereby to form a mold space having a predetermined thickness and volume. For this purpose, the two opposite side edges (the side facing the reader in FIG. 1 and the opposite side) of each of the lower platens 11 is provided with a longitudinally extending recess or groove having a vertical wall 52 and a horizontal shoulder or wall 54 (see FIG. 22). Affixed to the corresponding side edges of the upper platens 12 are longitudinally extending vertically disposed plate members 50 mounted in recesses along the respective edges of the platen and retained therein by machine screws of which one is shown at 51. The parts are of such dimension and are so disposed that as the upper platen descends into its lower terminal position, the lower edge of the plate member 50 is accurately received within the recess 52, 54 in the edge of the lower platen, and finally bottoms in the recess against the surface 54, as shown in FIG. 22. Thereafter the piston rods 40 of motors 32 continue to travel downwardly a short distance further to compress springs 49 to hold the opposed platens firmly closed. During the baking cycle the upper ends of the motors 32 remain subjected to high pressure, e.g., 1,000 psi.

Each platen set 11, 12 has means providing for the exhausting of air and steam from the mold cavity 60 between the closed platens. In the embodiment shown, such mold cavity venting means are provided along the two ends of each platen set, that is, along the ends of the platens which lie normal to the plane of the paper in FIG. 1. In FIG. 21, one such mold cavity means is shown at the left in that figure. As there shown, an elongated plate 55 is mounted in a recess along the end of the upper platen 12, the plate being retained as an insert in the platen by machine screws of which one is shown at 56. The lower portion 57 of the insert plate 55 telescopes over the upper edge of the lower platen 11 when the platens are in operative, closed position as shown. The inner surface of portion 57 of insert 55 is provided with a plurality of longitudinally spaced downwardly open channels 59, the upper ends of such channels extending upwardly past the edge of the mold cavity 60 between the platens. As a result, any air trapped between the platens, and any steam developed during the baking of the wafers in the mold cavity, have ready access to the atmosphere along the path depicted by the arrow in FIG. 21. As shown, the upper edge of a casing or shroud 61 surrounding and retaining the lower platen 11 is beveled, and lies spaced beneath the open lower ends of the mold venting channels 59.

THE BATTER SUPPLY

As shown in FIG. 1, batter is fed through a flexible conduit 65 to a manifold 66 which is connected to a horizontally reciprocable batter carriage 73 to move therewith. A branch pipe 67 leads off the manifold at the location of each of the four batter pumps 69 shown. The pumps 69 are fixedly disposed on the batter carriage, are mounted in alignment, and are driven by a common pump shaft 70 which is selectively driven by a rotary hydraulic motor 71 also mounted upon the batter carriage. The hydraulic motor 71 is provided with flexible inlet and outlet conduits 72 and 74. The outlet port of each of the batter pumps 69 is connected by a conduit 76 to a batter distributor and valve device 75 also secured to the reciprocable batter carriage. As will be more readily apparent hereinafter, each batter distributor and valve mechanism 75 attends and cooperates with a particular platen set, the devices 75 distributing batter to their respective platen sets upon each of the strokes of the batter carriage in either direction.

The Reciprocable Batter Carriage

The reciprocable batter carriage 73 includes a main longitudinal frame member 78, cross frame members at the ends thereof, and an outer, longitudinal vertical plate 77 affixed to member 78. Extending laterally outwardly from the longitudinal frame member 20, as most clearly shown in FIGS. 4, 5, and 6, are right and left-hand brackets 81 and 82, respectively, upon which there are supported upper and lower fixed horizontal guide rods 79 and 80, respectively. Rods 79 and 80 serve to support and guide the reciprocable batter carriage 73. Affixed to the carriage 73 are right and left slide collars 84 and 86, respectively, provided with passages with guide surfaces which accurately receive the rods 79 and 80. A laterally outwardly extending bracket 85 is attached to slide collar 84; a similar bracket 87 is attached to the slide collar 86. Brackets 85 and 87 serve to support microswitches forming parts of the automatic control system for the apparatus, to be described hereinafter.

The batter carriage 73 is reciprocated by a double-acting reciprocable hydraulic motor 89 the casing of which is supported on brackets affixed to frame member 20. The forward end of the piston rod 90 of motor 89 is secured to an arm 91 which is integral with the slide collar member 84, as shown in FIG. 6. It will be apparent that upon admitting fluid under pressure sequentially to the opposite ends of the cylinder of motor 89 while exhausting it from the other the batter-dispensing carriage 73 is moved in opposite directions between its left-hand terminal position, shown in FIG. 4, and its right-hand terminal position, shown in FIG. 5. In the position of FIG. 4 all of the batter-dispensing and valve mechanisms 75 are disposed to the left of their respective platen sets, while in the position thereof shown in FIG. 5 all of such mechanisms 75 lie at the right of their respective platen sets.

The Batter-Dispensing and Valve Mechanisms

Four batter-dispensing and valve mechanisms 75 are spaced along the batter carriage 73 at distances equal to the center distances between successive platen sets, the mechanisms 75 being supported on brackets 92 affixed to the upper surface of the longitudinally extending box girder 78 forming the main body of the batter carriage. (See FIGS. 7 and 13) The upper part of bracket 92 is in the form of a transversely extending horizontal sleeve 94 through which there extends the outer end of an inner tube 95 which is affixed to the bracket 92 and is held from rotation with respect thereto by a short radially-directed pin 97 on the tube 95 and a notch 99 in the inner edge of the sleeve portion 94 of the bracket receiving such pin. The batter-delivering conduit 76 from batter pump 69 is sealingly connected to the outer end of the tube 95 outwardly of the sleeve portion 94 of the bracket 92, as shown in FIG. 7.

An outer tube 96, which is mounted with its axis 0 eccentric with respect to the axis 0' of tube 95, is mounted for limited oscillation about the axis 0' between the valve fully-closed position of FIG. 16 and the valve fully-open position of FIG. 17. The device 75 includes a thickened hub portion 101 at the left thereof as shown in FIG. 13, the hub 101 being journalled upon a bushing 100 on the tube 95. A removable cap 102 on the outer end of the tube 96 is secured and sealed thereto. A bushing 107 in the outer end of tube 96 is secured in a fixed angular position by a pin 104 on the cap which extends through a slot 106 in the outer end of the tube 96. The bushing 100 in hub 101 at the left end and the bushing 107 in the cap 102 at the right end of the tube 96 provide aligned means for journalling tube 96 upon the inner tube 95 with the axes of the two tubes eccentric, as explained in connection with FIGS. 16 and 17. A split clamp 109 provided with an annular gasket 110 permits the outer tube 96 to be quickly disassembled from the hub 101, when necessary, as to clean the batter-dispensing and valve mechanism.

Affixed to the inner tube 95 in the position radially thereof shown in FIGS. 15 and 16 is an elongated shoe 115, the shoe being affixed to the tube by a plurality of machine screws 116. The outer tube 96 has a plurality of longitudinally spaced aligned batter-dispensing holes 117 therethrough, the holes 117 being so disposed as to dispense batter to form a batter layer 10' (FIG. 13) on the lower platen 11, the layer 10' being of substantially uniform thickness and having its edges substantially uniformly spaced from both its side and end edges of the lower platen 11. In zones on the shoe 115 which span the respective batter-dispensing holes 117 in tube 96 there are circumferentially extending shallow grooves 120 in the shoe 115, there being a broad and radially thick band 119 of rubber or rubber-like (elastomeric) material extending about the tube 95 and seated in each of the grooves 120.

The portion of the band 119 functions as one element of a valve to close the batter-dispensing openings 117 when the outer tube 96 has been turned clockwise (FIG. 16) to occupy the position shown in such figure. When the outer tube 96 has been turned counterclockwise from the position of FIG. 16 into that of FIG. 17, the inner sidewall of the tube 96 pulls away from the portion of the bands 119 occupying the grooves in the shoe 115, thereby to remove the batter-dispensing openings 117 from the rubber band and to dispose such openings in a lower, vertically-directed position. The inner tube 95 is provided with a plurality of openings 121 through the wall thereof, preferably directed generally oppositely from the batter-dispensing holes 117 in the outer tube, as shown. Batter delivered under pressure from the respective batter pump 69, upon the energization of motor 71, enters the inner tube 95, escapes therefrom into the space between tubes 95 and 96 through the openings 121 in the wall of tube 95, and then escapes through the batter-dispensing openings 117 in the tube 96 when the parts of the dispenser and valve are disposed as shown in FIG. 17.

The sequence of operations of the batter-dispensing and valve mechanism 75 in the travel of the batter carriage from its left-hand terminal position to its right-hand terminal position (FIG. 1) is schematically shown in FIG. 18. In its left-hand terminal position the valve is closed, and the mechanism 75 lies intermediate two successive platen sets, of which only the lower platens 11 are shown. At the proper time in the cycle, with the upper platen raised and the previously baked wafer book removed from the lower platen 11, the batter carriage 73 begins to move to the right carrying with it the mechanisms 75. Each of such mechanisms is operated, by a valve-controlling linkage to be described, so that the valve opens when the batter dispenser lies a predetermined point inwardly from the left-hand edge of the platen 11, wherein the outer tube is designated 96a. The valve continues to remain open through successive positions 96b, etc. until it reaches the position 96c where the dispensing openings 117 lie somewhat inwardly of the right-hand edge of the platen 11. Thereupon the outer tube 96 is turned to close the valve; the valve remains closed in the further travel of the device 75 to the position 96r, in which it remains until the beginning of the next cycle in which it will now move from the position 96r through the valve-open, dispensing positions over the platens 11 into the valve-closed position at the left where it is designated 96l.

The Batter-Dispensing Valve Controlling Linkage

Affixed to the outer end of the hub 101 of each of the outer tubes 96 of the respective dispensing and valve mechanisms 75 is a lever 122 in the form of a plate having a split lower clamping end 125 formed by a slot leading radially from a passage through the member 122 in which there is received the smaller diametered outer end portion 124 of the hub 101. The clamp is tightened upon portion 124 of the hub by a stud 126 extending through a hole in one ear of the split clamp and threaded into the other ear. The lever 122 has an upper arm 127 forming a jaw fixedly connected to the lever. A two-armed lever 129 mounted upon member 122 by a pivot pin 130 forms a movable jaw 131 opposed to fixed jaw 127, the jaw 131 being constantly urged in a counterclockwise position as it is shown in FIG. 14 by a coil compression spring 132 acting between a spring seat on member 122 and the second, lower arm of lever 129.

The jaws 127, 131 receive between them a cross pin 134 affixed to two longitudinally extending parallel flat rods or links 135 (FIGS. 1 and 13), the reciprocation of the members 135 along their lengths turning the outer tube 96 of each of the mechanisms 75 from their closed positions, shown in solid lines in FIG. 14, to their open positions, shown in phantom lines in that figure. The jaw 127 is made as an integral fixed part of the member 122 since the cross pin 134 thrusts against jaw 127 only when the valve of mechanism 75 is being opened and the rubber bands 119 are thus relieved from contact with the inner surface of the outer tube 96. The jaw 131, however, is made to yield against the action of spring 132 when the cross pin 134 turns the outer tube 96 into its valve-closed position. Such yielding of the jaw 131 prevents the over-tightening of the rubber bands 119 against the inner wall of the outer tube 96, thereby preventing distortion of the rubber bands and their eventual damage whereby they would not effectually close the batter-dispensing openings 117.

Turning now to FIGS. 1 and 4, it will be seen that an upstanding bracket 136 is connected to the left-hand end of the box girder 78 of the batter carriage 73, there being an upstanding link 137 pivotally connected at its lower end to the upper end of the bracket 136. An upstanding bracket 141 is affixed to the right-hand end of the girder member 78 of the batter carriage. A generally vertical two-armed lever is pivotally mounted on the bracket 141 by a pivot pin 140. The upper arm 139 of the two-armed lever is of the same length as and is disposed parallel to the link 137. The two horizontal elongated rods or links 135 are pivotally connected to the upper ends of the link 137 and the lever arm 139, as shown. The lower arm 142 of the two-armed lever extends downwardly and is pivotally connected at its lower end by a clevis joint to the outer end of the piston rod 144 of a double-acting reciprocable fluid motor 145 the axially inner end of which is pivotally connected to a bracket affixed to the lower side of the box girder forming the body of the batter carriage. It will be apparent that actuation of the piston rod 144 of motor 145 to extend the rod from the cylinder will open the valves of all of the dispensing and valve devices 75 simultaneously, and that actuation of the motor 145 to retract the piston rod into the position thereof shown in FIG. 4 will close such valves.

THE VACUUM PICK-UP

There are four vacuum pick-up heads 146, one disposed in transverse alignment with the respective two aligned platen sets of the two banks A and B of such platen sets. As above-explained, each such pick-up head alternately serves its platen set in one bank and its platen set in the other bank. The four pick-up heads are shown in FIG. 1; a single pick-up head is shown perhaps most clearly in FIGS. 2 and 7. The four pick-up heads are mounted upon a longitudinally extending conduit 147 which is connected at both ends to a selectively energized source of vacuum. As shown in FIG. 1, the total height of the pick-up heads 146 and the conduit 147 is substantially less than that of the space between the upper and lower platens 12 and 11 when the platens are separated, so that the vacuum heads 146 and the conduit 147 may enter between the platens when they are open to remove the baked wafer books from the lower platens.

Each vacuum head 146, which in transverse section is in the form of a truncated isosceles triangle and in longitudinal vertical section is rectangular, has a multi-perforated bottom plate of such length and width as fully to cover the baked wafer 10. When the vacuum head is lowered to bring the plate 149 into proximity with the baked wafer 10 and the vacuum is turned on, the wafer is sucked upwardly against the bottom plate of the vacuum head so that it is carried thereby first to be raised from the platen 11 and then to be transferred into its central position as shown in FIG. 2. Thereupon the vacuum is cut off at the proper time to drop the wafer upon the conveyor belts 13 so that the rear edges of the wafers are engaged by the lugs 18. If desired, the perforated bottom plate 149 may be provided with soft sponge rubber rings around each of the holes therethrough so that any baked wafer 10, which may have become warped out of a plane, will not be broken when it is gripped by the vacuum head.

The vacuum conduit 147 is symmetrical end-to-end, is supported by similar means at each of its ends, and is connected to the vacuum source by similar jointed conduit means which permit the described movements of the vacuum heads 146 and the conduit 147. The manner of support of each end of the conduit 147 is most clearly shown in FIGS. 10, 11, and 12. A carriage in the form of a vertical plate 150 is provided with two spaced upstanding hangers 152 on the upper ends of which are journalled guiding rollers 151. In the main, intermediate zone of the lateral travel of the carriage 150 the wheels run upon a tranversely extending horizontal track 154 which is made in the form of a lower flange upon a channel member 155 which is secured to the outer side of the cross frame member 24. (See FIGS. 7 and 8) As shown in FIG. 10, the outer ends of the rectangular conduit 147 are enlarged and brought to circular shape at the zone 153 where such end is attached to its respective carriage-forming plate 150. A swivel connection is provided between the rounded zone 152 at the ends of the conduit 147 and the vacuum conduit supply system, in a manner to be described.

The carriages 150 at the ends of the conduit 147, the conduit, and the vacuum heads carried thereby are reciprocated in a horizontal direction and lowered when the vacuum heads are disposed above the platens 11 of the then open platen sets to grasp the baked wafers, are again raised and thereafter returned to their central position, shown in FIG. 2, in position to be dropped upon the conveyor belts 13. At each of the forward and rear ends of the apparatus there is located the following mechanism: A discontinuous chain 156 has the opposite ends thereof pivotally connected by pins 158 to the respective hangers 152 of the carriage 150, as shown. Chain 156 is entrained at its right-hand end over an idle sprocket 157 (FIG. 2) and at its left-hand end over a driven sprocket 159. Synchronous rotation of the sprocket 159 in opposite directions, in a manner to be described, causes the carriages 150, the conduit 147, and the vacuum heads 146 supported thereby to be traversed in opposite directions from the central position thereof shown in FIG. 2 first to the left, for example, to its left terminal position, back again to its central position, and then at an appropriate later time horizontally to its right-hand terminal position and then back again to its central position. The driving means for the sprockets 159 at the respective ends of the apparatus will be described hereinafter.

As above-explained, after the vacuum heads have reached either their right or left terminal positions between the then-opened platens of the platen sets of the respective banks A and B which they are then servicing, the vacuum heads are then lowered to bring the perforated lower plates 149 thereof downwardly into proximity with the upper surface of the baked wafers 10 on the lower platens 11. The primary means for lowering and then raising the carriages 150 in synchronism is shown in FIGS. 8 to 12, inclusive. At each end of the fixed intermediate track 154 there is disposed a vertically movable track section 160 having an upstanding end stop 161 affixed thereto. In the upper position of the track 160 it lies in horizontal alignment with the fixed track 154 as shown in FIG. 8. An upper track section 162, lying above and parallel to the track section 160, is spaced from track 160 a distance sufficient to provide for the entry of the carriage-supporting rollers 151 therebetween. The tracks 160, 162 are affixed to a vertically adjustble slide 164 which is accurately guided for vertical movement between spaced confronting L-shaped guides 165 which overlie rabbeted vertical edge portions of the slide 164. The guide members 165 are affixed to a frame member 166, as shown in FIG. 12. The means for vertically reciprocating the slides 164 will be described hereinafter.

The Driving Means for the Vacuum Pick-Up Carriages

A reversible rotary hydraulic motor 167 (shown at the lower right-hand corner in FIG. 1) is provided with a drive sprocket 169 over which there is entrained a driving chain 170 which passes about and drives a sprocket 171 on a cross shaft 172. Over a sprocket 174 affixed to the shaft 172 outwardly of the sprocket 171 there is entrained a second chain 175 which passes upwardly about a sprocket 176 affixed to a horizontally disposed stub shaft 177, all as shown at the right in FIG. 1. Similar parts at the left-hand end of FIG. 1, starting with the sprocket on cross shaft 172 corresponding to sprocket 174, are designated by the same reference characters but with added primes ('). Affixed to the stub shaft 177 inwardly of the bearing which supports it on the frame of the apparatus is a pinion 180 (FIG. 2). Pinion 180 meshes with a pinion 179 of the same size, pinion 179 being affixed to the stub shaft 158 to which the sprocket 159 is also affixed. The sprockets 157, of which one is shown in FIG. 2, over which the other ends of the chains 156 are entrained, are idle. The described manner of driving the sprockets 159, 159' at the opposite ends of the apparatus insures the synchronous, non-binding travel of the two carriages 150 which carry the opposite ends of the vacuum conduit 147, upon rotation of the rotary hydraulic motor 167. Sufficient slack is provided in each of the chains 156 to permit movement of the carriages 150 with the slides 164 when the vacuum heads lie at the ends of their horizontal traverse, for example, from the raised position of FIG. 8 to the lowered position of FIG. 10, without causing binding of the parts.

The Mechanism for Raising and Lowering the Vacuum Heads

It will be understood from the foregoing that there are four vertically adjustable slides 164 upon which the end track portions 160, 162 are mounted. There are two slides 164 at the right-hand end of the apparatus as it is shown in FIG. 1 and two slides 164 at the left-hand end of such apparatus. All of such slides are connected together by lever and link means so that they are operated simultaneously and in synchronism by a single prime mover; thus, all of the slides 164 rise simultaneously and all of them descend simultaneously.

A transverse rock shaft 181 is provided at the right-hand end of the apparatus as shown in FIG. 9, and a simlar rock shaft 182 is provided at the left-hand end of such apparatus, the rock shafts being disposed generally vertically above each pair of slides 164 at the respective ends of the apparatus. The rock shafts 181, 182 are connected by a longitudinally extending tie rod 185 which is pivotally connected to the upper ends of the lever arms 184. Movement of the tie rod 185 in opposite directions along its length causes the rock shafts 181, 182 to oscillate in synchronism and in phase. Such reciprocation of the tie rod 185 is effected by a doubleacting reciprocable hydraulic motor 186, the casing of which is pivotally connected to a bracket 187 affixed to the frame of the apparatus. The outer end of the piston rod 189 of motor 186 is pivotally connected to the right-hand end of the tie rod 185 and to the upper end of the right-hand lever arm 184 as the parts are shown in FIG. 9.

The rock shafts 181 and 182 are each provided at their ends with lever arms 190 which project generally horizontally from the rock shafts in the same direction as shown in FIG. 9. A link 191 extends between the outer end of each lever arm 190 and the respective vertically adjustable slide 164, and is pivotally connected to both such elements. It will thus be apparent that upon the thrusting outwardly of the piston rod 189 of motor 186 all four vertically adjustable slides 164 are lowered, carrying with them the end tracks 160, 160°, and that retraction of the piston rod 189 will raise all such slides 164 simultaneously.

The Vacuum System

A conduit 192, shown in FIGS. 1 and 3, extends to a source of vacucum (not shown). A conduit 192 is connected to a vacuum valve 194 which selectively connects the vacuum pick-up heads to the source of vacuum, whereby the vacuum heads are energized to pick up and retain baked wafers, and are connected to the atmosphere whereby the vacuum pick-up heads will drop such wafers.

The valve 194 has three ports: a port 197 at the left connected to the vacuum conduit 192, a port 200 at the right selectively connecting the interior of the valve to the atmosphere, and a port 202 at the bottom connected to a conduit 201 which extends longitudinally of the apparatus throughout its entire length. The valve 194 has a horizontally reciprocable valve element 195 which includes a rod 204 upon which there are affixed a larger disc 196 and a smaller disc 199 which selectively cooperate with the ports 197 and 200, respectively. When the valve element 195 is in the position shown in FIG. 3, the conduit 201, which is connected to the vacuum pick-up heads in a manner to be described, is connected to the source of vacuum and the interior of the valve is closed off from the atmosphere. When the valve element 195 is thrust into its left-hand terminal position, the conduit 201 and thus the vacuum pick-up heads are cut off from the vacuum source and are connected to the atmosphere through the now open port 200, the port 202, and the conduit 201. The valve element 195 is selectively reciprocated into its two terminal positions by a double-acting reciprocable hydraulic motor 206 having a piston rod 205 pivotally connected to the outer end of the rod 204 of the valve, and its casing pivotally connected to a bracket 207 which is fixedly connected to the frame of the apparatus. The vacuum valve 194 is connected to the conduit 201 centrally of the length of the latter in order to equalize the flow of air through the conduit system both when the vacuum pick-up heads are connected to the source of vacuum and when they are connected to the atmosphere. To attain such condition, the conduit means connecting each end of the conduit 201 to the conduit 147 carrying the vacuum heads 146 are identical.

The left and right-hand ends of the conduit 201 (FIG. 1) are connected respectively to fixed vertical conduit portions 209 and 210. Since the two conduit means connecting the upper ends of the vertical vacuum conduits to the respective ends of the conduit 147 are identical, it will suffice to describe only one in detail. As shown in FIG. 2, the upper end of the vertical conduit 209 is connected by a swivel joint 211 to a first pivotable conduit section 212 which, in turn, is connected through a second pivot joint 214 to a second pivotable conduit section 215. The lower end of conduit section 215 is connected by a pivot joint 216 to the respective rounded end portion 153 of the conduit 147.

In the embodiment of the apparatus shown herein and described above, all of the prime movers employed therein are hydraulic motors, the only electrical power used in the apparatus proper being that which heats the upper and lower platens of the various platen sets. The various hydraulic prime movers of the apparatus are under the control of a programmer 220, shown schematically in FIG. 1, from which there extend a plurality of conduits, schematically indicated at 221, which lead hydraulic fluid under pressure to the various prime movers and exhaust it therefrom. The programmer includes electromagnetically operated valves interposed in the hydraulic circuits of the various hydraulic motors, the programmer being so constructed and arranged to cause the above-described functions of the apparatus to take place in the proper sequence. One complete cycle of one bank (Bank A) of platen sets is outlined in the flow diagram of FIG. 25 of the drawings. The apparatus is provided with "proof of position" means, such as microswitches, pressure-responsive transducers, and the like for each of its functions so that a function must be fulfilled before the next step in the cycle can begin.

THE AUTOMATIC CONTROLS

A first microswitch 233, shown in FIGS. 1, 7, and 24, is mounted on the frame of the apparatus so as to be actuated by the rising of the mounting plate 41 of one of the upper platens 12 into its upper terminal position. This gives proof to the programmer that the upper platens in the bank of platen sets in question has risen so that now the vacuum head may be actuated to move between the separated platen of such set. A second microswitch 230 is mounted on a bracket 82 on the frame of the apparatus, as shown in FIGS. 4, 5, and 6. Switch 230 has an operating arm 231 which is engaged by an abutment 232 on arm 91 on the batter carriage 73 when such carriage has moved completely to the left (FIGS. 1-4, inclusive).

A third microswitch 234 is mounted on the frame of the apparatus so that its arm 235 is engaged by an abutment 236 on the left end of the batter carriage 73 when such carriage occupies its full right position. A fourth microswitch 239 which starts the rotary hydraulic motor 71 for driving the batter pumps is provided with a plunger 242. Plunger 242 is depressed by an elongated cam 241 adjustably mounted on the rod 240 which travels with the batter carriage. A further microswitch 244 having a plunger 245 is operated by a second elongated cam 246 adjustably mounted upon the rod 240 which travels with the batter carriage. As shown in FIG. 7, all of switches 234, 239, and 244 are mounted upon the arm 91 which extends outwardly from the longitudinal frame member 20 of the apparatus.

Fixedly mounted at the longitudinal center line of the apparatus is a further switch 247 provided with a plunger 249 bearing a roller 250 which is adapted to roll upon and be actuated by a symmetrical cam 251 which is mounted upon a vertical plate 150 of the vacuum conduit supporting carriage. When the plunger 249 of switch 247 is thrusst upwardly by cam 251, the vacuum pick-up heads are in the proper central position in which to drop their wafers. As shown in FIG. 1, the cam 251 is secured to the free end of an arm 252 which is secured to the vacuum conduit 147, and the switch 247 is mounted upon the stationary frame member 166.

As shown in FIG. 23, the apparatus is provided with a further switch 254, at the left in such Figure, which locates the vacuum heads at the left-hand terminus of their travel, another switch 255 which locates the vacuum heads at the right-hand terminus of their travel, and a switch 256 which is mounted on the frame of the apparatus and is operated by one of the vertically adjustable slides 164 when such slide has reached its upper position, in alignment with the fixed track 154.

As schematically shown in FIG. 1, the upper ends of the cylinders 32 are suppplied with hydraulic fluid under pressure from a source, not shown. A pressure-responsive transducer 257 is acted upon by the hydraulic pressure in such supply line to the cylinders 32, such transducer transmitting its response to the programer 220. When the motors 32 have thrust their platens 12 downwardly into closed position, the pressure in the hydraulic supply line connecting to the cylinders builds up. The transducer 257, which is preferably adjustable, feeds its response into the programer 220 so that until the response is such as to show the attainment of a predetermined high pressure in the hydraulic fluid supply line, the next step in the cycle shown in FIG. 25 cannot take place.

THE METHOD OF OPERATION

Turning particularly to FIGS. 23, 24, and 25 of the drawings, we will trace through one cycle of operation of Bank A of the above-described apparatus. The timer of Bank A in the programer signals the end of the back cycle of Bank A. Thereupon the programer operates the valve (not shown) which admits hydraulic fluid under pressure to the lower ends of motors 32 to raise the upper platens 12 of the bank. As the upper platens 12 approach their upper terminal position, one of them operates the microswitch 233 (FIGS. 1, 7, and 24). The response of switch 233, which is fed into the programer, causes the vacuum heads 146 to be moved to the left (FIG. 23) by energizing the rotary hydraulic motor 167 to rotate in the correct direction.

When the vacuum heads 146 reach their left terminal position, they operate the microswitch 254, thereby giving the programer a proof of position signal of the vacuum heads. Thereupon, hydraulic motor 186 is operated so as to lower the slides 164 of the Bank A of the apparatus. When the slides 164 have reached their lowermost position, carrying with them, of course, the vacuum heads 146, the programer actuates motor 206, thereby to operate the vacuum valve 194 so as to direct vacuum to the vacuum heads. Thereafter the motor 186 moves in the reverse direction so as to raise the slides 164 and with them the vacuum heads and the baked wafers grasped thereby. A microswitch 256 (FIG. 23) signals the programer the proof of the uppermost terminal position of the motor 186.

The programer now operates the rotary hydraulic motor 167 in the reverse direction so as to return the vacucum heads 146 to their central position, above the conveyor belts 13. The cam 251, which moves with the vacuum head carriage, interacts with the microswitch 247 to signal the programer that the suction heads are in their central position; the programer then stops the rotation of the motor 167. Following return of the vacuum heads to their central position, the programer energizes the circuit containing the microswitch 257 which selectively energizes the circuit leading to the electromagnetic valve 259 for controlling the hydraulic motor 206 (FIG. 3). Switch 257 is actuated by a lug 18 on one of conveyor belts 13 so as to signal vacuum valve operation, closing the vacuum valve 174 and venting the system, including the vacuum heads, to the atmosphere. Thereupon the wafers 10 grasped by the respective vacuum heads are dropped into the pockets presented between successive sets of lugs 18 on the conveyor belts.

Turning now particularly to FIG. 24, the operation of the microswitch 247 by the cam 251 associated with the vacuum head carriage, when the carriage has reached its central position, has, through the programer, caused hydraulic fluid to be fed under pressure to the right-hand end of the motor 89 and to be exhausted from the other end thereof, whereby to move the batter carriage 73 to the left. As we have seen above, the carriage 73 has the batter pumps, the batter pump driving motor 71, and the batter-dispensing and valve mechanisms 75 mounted thereon. In the solid line position of the batter carriage 73 shown in FIG. 24, the batter carriage is at its right-hand terminal position. In the phantom line left-hand position thereof, the left-hand portion of the carriage is shown in phantom lines at the left.

In the travel of the batter carriage 73 from its right-hand terminal position to its left-hand terminal position, the following switches are sequentially operated:

The inclined ramp-like left-hand end of the elongated cam 246 which travels with the carriage first engages the arm of the switch 244, which then signals the programer to open the batter valves 75. The inclined, ramp-like left-hand end of the elongated cam 241 then operates the microswitch 239 to start the batter pump driving motor 71. This causes the batter to flow almost instantly from the batter dispensing and valve mechanism 75 onto the respective lower platens 11. As above-explained, the parts are preferably so arranged that such flow of batter begins after the mechanism 75 has moved inwardly a predetermined distance (e.g., about 3 inches) from the side of the platen 11 which it first encounters in its longitudinal travel. The batter pumps 69 remain operating until the inclined right-hand end of the cam 241 runs out of engagement with the operating means of microswitch 239. Thereupon, the batter pumps 69 stop. The pumps 69 preferably stop when the dispenser and valve mechanisms 75 are at the same predetermined distance (e.g., about 3 inches) inwardly of the second opposite side of the platens 11. Upon further travel to the left of the batter carriage, the right-hand inclined end of the cam 246 runs out of engagement with the operating arm of the microswitch 244, thereby closing all of the dispensing and valve mechanisms 75.

The batter carriage 73 continues its travel to the left until it reaches its left-hand terminal position schematically shown at 73' in FIG. 24. When the carriage has reached such position, the arm 232 on the carriage operates the microswitch 230 thereby to signal the programer that the carriage 73 has reached its left-hand terminal position. In such position, the dispensing and valve mechanisms 75 all lie to the left of the respective lower platens 11 which they service. The motors 32 which operate the movable upper platens 12 are then lowered by directing hydraulic fluid under pressure to the upper ends of the motors 32 while exhausting fluid from the lower ends thereof. This action continues until the platens 11 and 12 are fully engaged as shown in FIGS. 21 and 22 and the coil compression springs 49 are placed under increasing compression. Such compression builds up as the hydraulic pressure in the upper ends of the motors 32 increases until it reaches the pressure to which the pressure switch 260 has been set, e.g., 1,000 psi. The pressure switch 260 then signals the timer A in the programmer to start the bake cycle of the platen sets in Bank A.

A predetermined time after the bake cycle of the platen sets in Bank A has started, the programer starts the bake cycle of Bank B. As above-explained, the entire cycles of Banks A and B are identical, but are displaced in time so that while the platen sets of one bank are separated and are being serviced, the platen sets of the other bank are closed and baking wafers. Upon the initiation of the bake cycle of Bank B, Bank B then proceeds to carry out the same entire cycle as that above-described in connection with Bank A.

Although a single embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without de-

What is claimed is:

1. Wafer-baking apparatus comprising, a fixedly positioned platen set comprising upper and lower platens, means selectively to advance the platens relatively to each other to form a wafer-shaping cavity therebetween and to separate the platens to permit the removal of the baked wafer from the cavity, means for heating the platens to predetermined desired baking temperatures, means introducible between the separated platens for grasping a wafer on the lower platen and then moving with it from between the platens, a second platen set similar to the first-recited platen set fixedly disposed in alignment therewith and spaced laterally thereof, and means controlling the separation and relative advance of the two platen sets so that the first platen set is closed and baking a wafer when the second platen set is being opened and having its baked wafer removed therefrom, the means for removing a baked wafer from the first platen set when the platens thereof are separated being so constructed and arranged as to remove the wafer from the second platen set when the platens thereof are opened.

2. Apparatus as defined in claim 1, comprising means automatically actuated by the removal of the wafer grasping means and the baked wafer grasped thereby from each separated platen set to dispense a charge of batter upon the lower platen of the said separated platen set.

3. Apparatus as defined in claim 1, wherein the means for removing the baked wafer from the lower platen of the separated platens comprises a vacuum head, means to introduce the vacuum head between the separated platens and above the baked wafer, means to subject the vacuum head to vaccum whereby it grasps the wafer means to move the vacuum head and wafer grasped thereby laterally from between the platens, and means thereafter to cut off the vacuum from the vacuum head to deenergize it whereby the wafer drops therefrom.

4. Apparatus as defined in claim 3, comprising means to lower the vaccum head to bring its lower surface into proximity with the wafer on the lower platen after the vaccum head has been introduced between the separated platens, means for thereafter energizing the means for subjecting the vacuum head to vacuum, means for then raising the vacuum head with the wafer grasped thereby and then moving the vacuum head with the grasped wafer laterally from between the separated platens.

5. Apparatus as defined in claim 4, comprising means responsive to the separated condition of the platens to energize the means to introduce the vacuum head between the separated platens, and means responsive to the positioning of the vaccm head between the separated platens to lower the vaccum head into proximity with the baked wafer and then to raise the vaccum head with the wafer grasped thereby.

6. Apparatus as defined in claim 5, comprising means responsive to the completion of the raising of the vacuum head with the wafer grasped thereby to move the vacuum head with the grasped wafer laterally outwardly from between the separated platens.

7. Apparatus as defined in claim 5, comprising means responsive to completion of movement of the vacuum head laterally outwardly from between the separated platens to dispense a charge of batter upon the lower platen of a separated platen set.

8. Apparatus as defined in claim 3, comprising a belt conveyor disposed beneath the vacuum head when the latter is withdrawn from between the separated platens, the conveyor having means thereon defining wafer-receiving pockets, the means for cutting off vacuum from the vacuum head comprising means synchronized with the travel of the conveyor to cut off the vacuum when a pocket on the conveyor is in position to receive a wafer dropped by the deenergized vacuum head.

9. Apparatus as defined in claim 3, comprising means to lower the vacuum head to bring its lower surface into proximity with the wafer on the lower platen of the respective platen set after the vacuum head has been introduced between the separated platens of such set, means for thereafter energizing the means for subjecting the vacuum head to vacuum, and means for thereafter raising the vacuum head with the wafer grasped thereby and then moving the vacuum head with the grasped wafer laterally from between the separated platens.

10. Apparatus as defined in claim 3, wherein said first-recited and second platen sets are disposed in parallel similar rows of platen sets, means to operate the platen sets in each row in synchronism and in phase, and comprising a plurality of aligned vacuum heads connected to move in synchronism and in phase sequentially to discharge baked wafers from the opposite rows of platen sets.

11. Apparatus as defined in claim 3, comprising horizontal track means for supporting and guiding the vacuum head horizontally from its central position into each of its lateral terminal positions in which it lies between the separated platens of the respective platen sets.

12. Apparatus as defined in claim 11, wherein the track means comprises a fixed central track portion and two track portions at the ends of the central portion movable vertically downwardly from and upwardly to a position of alignment with the central portion, the vacuum head being supported upon an end portion of the track when the vacuum head is disposed between the separated platens of a respective platen set.

13. Apparatus as defined in claim 3, comprising means responsive to the separated condition of the platens to energize the means to introduce the vacuum head between the separated platens.

14. Wafer-baking apparatus comprising, a fixedly positioned platen set comprising upper and lower platens, means selectively to advance the platens relatively to each other to form a wafer-shaping cavity therebetween and to separate the platens to permit the removal of the baked wafer from the cavity, means for heating the platens to predetermined desired baking temperatures, means introducible between the separated platens for grasping a wafer on the lower platen and then moving with it from between the platens, and means automatically actuated by the removal of the wafer grasping means and the baked wafer grasped thereby from the separated platen set to dispense a charge of batter upon the lower platen of the separated platen set.

15. Apparatus as defined in claim 14, wherein the batter dispensing means comprises a batter carriage reciprocable longitudinally of the platen set, means for reciprocating the batter carriage, a batter-distributing nozzle mounted on the carriage, and means for controlling the batter carriage and the batter-distributing means so that the batter-distributing means dispenses batter upon the lower platen of the separated platen set in a first cycle when the batter carriage is travelling in one direction relative to the platen set and distributes batter to the lower platen of the open platen set in the succeeding cycle when the batter carriage is travelling in the reverse direction relative to the platen set.

16. Apparatus as defined in claim 15, wherein the batter-distributing nozzle is elongated and is mounted on the carriage transversely of the direction of reciprocation of the carriage, and is disposed at a level above the upper surface of the lower platen.

17. Apparatus as defined in claim 16, wherein the means controlling the batter-dispensing means is a valve, and means controlling the opening and closing of the valve so that the valve opens a predetermined distance inwardly of the edge of the lower platen which it first encounters in one operative transverse with respect thereto and closes a predetermined distance in advance of its passage over the second, opposite edge of the lower platen which it encounters in such traverse.

18. Apparatus as defined in claim 17, comprising a selectively operated prime mover, and linkage means extending between the prime mover and the batter-dispensing and valve means for selectively operating such last-named means.

19. Apparatus as defined in claim 18, wherein the prime mover is mounted on the batter carriage.

20. Apparatus as defined in claim 14, wherein there are a plurality of platen sets disposed in uniformly-spaced relationship in a row, a batter carriage reciprocable in a path parallel to the row of platen sets, a plurality of similar batter-dispensing and valve mechanisms mounted on the batter carriage and spaced therealong through the same distances as between the centers of successive platen sets, a selectively operated prime mover mounted on the batter carriage, and linkage means extending between the prime mover and the successive batter-dispensing and valve means for selectively operating such last-named means synchronously and in phase.

21. Apparatus according to claim 14, comprising a plurality of similar parallel lines of similar platen sets which are spaced uniformly in said lines, and wherein the batter-dispensing means comprises a batter carriage for each line of platens, each carriage reciprocating parallel to the respective lines of platen sets, means for reciprocating each batter carriage, means for operating all of the platen sets in each line simultaneously in the platen sets in the respective lines synchronously and in phase, a plurality of aligned batter-dispensing and valve means on each of the batter carriages and spaced uniformly at the same distance as the spacing between successive aligned platen sets in each line of platen sets, and means for controlling all of the aligned batter-dispensing and valve means for the respective lines of platens simultaneously and in the same manner to dispense charges of batter from the lower platens of the respective platen sets as the carriages move in opposite directions in successive wafer-baking cycles of the apparatus.

22. Apparatus as defined in claim 21, wherein the batter-dispensing means for each line of platen sets comprises a batter pump mounted on the respective batter carriage, a motor for driving the pump, the battery pump feeding the batter under pressure to the batter-dispensing and valve mechanism, opening the batter-dispensing valve for a predetermined interval in each stroke of the battery carriage, and means for energizing the pump-driving motor during a predetermined interval in the period in which the batter-dispensing valve is open in the traverse of the batter carriage in each direction.

23. Apparatus according to claim 22, wherein the means controlling the motor driving the batter pump starts the motor a short time after the batter-dispensing valve opens, and stops the motor a short time before such valve closes.

24. Wafer-baking apparatus comprising, a platen set comprising upper and lower platens, means holding the lower platen in a fixed position, means selectively to advance the platens relatively to each other to form a wafer-shaping cavity therebetween and to separate the platens to permit the removal of the baked wafer from the cavity, means for heating the platens to determined desired baking temperatures, means introducible between the separated platens for grasping a wafer on the lower platen and removing it from between the platens, and means automatically actuated after the removal of the baked wafer from the separated platen set to dispense a charge of batter upon the lower platen of the separated platen set, the batter-dispening means comprising a first, inner conduit disposed transverse to the platen set and above the upper surface of the lower platen, a second, outer conduit telescoped over the first conduit and extending parallel thereto, means mounting the first and second conduits eccentric with respect to each other, means sealing the ends of the two conduits together to form an eccentric, sleeve-like space between the conduits, a plurality of ports through the wall of the first conduit communicating with said sleeve-like space, means supplying the interior of the first conduit with batter under pressure, a plurality of batter-dispensing openings through the wall of the second conduit, and valve means disposed in the sleeve-like space between the two conduits for selectively opening and closing the batter-dispensing ports through the wall of the second conduit by turning the two conduits in opposite directions with respect to each other.

25. Apparatus as defined in claim 24, wherein the inner tube is fixed from rotation about its axis and the outer tube rotates with respect thereto, the batter-dispensing ports through the wall of the outer tube being aligned in a row disposed parallel to the axis thereof, the valve means comprising means on the inner tube engaging the inner surface of the outer tube in zones surrounding the inner ends of the batter-dispensing ports through the outer tube to close such ports when the outer tube is swung in one direction, the inner ends of the ports being spaced from the valve means when the outer tube is rotated in the other direction, such ports facing the lower platen of a platen set when the valve means is in open position.

26. Apparatus as defined in claim 25, wherein the valve means includes imperforate elastomeric means on the inner tube which forcibly engage and seal the inner end of each of the batter-dispensing ports through the outer tube when the valve means is in closed position.

27. Apparatus as defined in claim 26, wherein the valve means comprise a plurality of elastomeric bands telescoped over the inner tube and spaced therealong, the bands being so disposed as to overlie the respective batter-dispensing ports through the wall of the outer tube when the valve means is closed.

28. Apparatus as defined in claim 27, comprising an elongated shoe affixed to the outer wall of the inner tube parallel to the axis thereof at one angular zone thereabout, the shoe protruding radially outwardly past the surface of the outer tube, there being a plurality of longitudinally spaced grooves in the outer face of the shoe, the elastomeric bands being disposed in said grooves, the portion of the bands in the grooves in the shoe overlying and sealingly engaging the inner ends of the batter-dispensing ports through the wall of the outer tube when the valve is closed.

29. Wafer-baking apparatus comprising, a platen set comprising upper and lower parallel platens fixed against longitudinal and lateral travel, means periodically to advance the platens relatively to each other to form a wafer-shaping cavity therebetween and to separate the platens to permit the removal of the baked wafer from the cavity, means for heating the platens to predetermined desired baking temperatures, and means for dispensing batter upon the lower platen after each removal of a baked wafer therefrom, said last-named means comprising a batter carriage, the platen set and the carriage being reciprocable longitudinally with respect to each other, a batter-distributing nozzle mounted on the carriage means for controlling the batter carriage and the batter-distributing means so that the batter-distributing means dispenses batter upon the lower platen of the separated platen set in a first cycle when the batter carriage is travelling in the reverse direction relative to the platen set, and means automatically actuated after the separation of the platens and the removal of the baked wafer therefrom to initiate travel of the batter carriage and to deliver batter to the batter-dispensing nozzle.

30. Apparatus according to claim 29, comprising a plurality of similar aligned platen sets which are spaced uniformly in a longitudinal direction, wherein the batter carriage reciprocates parallel to the line of platen sets, comprising means for operating all of the platen sets synchronously and in phase, a plurality of batter-dispensing and valve means on the batter carriage and spaced uniformly at the same distance as the spacing between successive platen sets, and means for controlling all of the batter-dispensing and valve means simultaneously and in the same manner to dispense charges of batter upon the lower platens of the respective platen sets as the batter carriage moves in opposite directions in successive wafer-baking cycles of the apparatus.

31. Apparatus as defined in claim 30, comprising a plurality of batter pumps mounted on the batter carriage, a motor mounted on the batter carriage for driving the pumps, the batter pumps feeding the batter under pressure to the respective batter-dispensing and valve mechanism, means for opening the batter-dispensing valve for a predetermined interval in each stroke of the batter carriage, and means for energizing the pump-driving motor during a predetermined interval in the period in which the batter-dispensing valve is open in the transverse of the batter carriage in each direction.

32. Wafer-baking apparatus comprising a platen set comprising upper and lower platens, driving means selectively to advance one of the platens relatively toward the other to form a wafer-shaping cavity therebetween and to separate the platens to permit the removal of the baked wafer from the cavity, interacting stop means of the platens to limit the degree of approach of the platens toward each other, means for heating the platens to predetermined desired baking temperatures, and yieldable means placed in compression between the driving means and the one platen for cushioning the application of cavity-closing force to the platens by the driving means.

33. Apparatus as defined in claim 32, wherein the driving means is a reciprocable fluid motor having a piston and piston rod, a plate member centrally affixed to the outer end of the piston rod and disposed in a plane normal to the length of the piston rod, and a plurality of similar coil compression springs interposed between the plate member and the said one platen and distributed substantially uniformly over the confronting areas of the plate member and the said one platen.

34. Apparatus as defined in claim 33, comprising means for maintaining the springs under compression at all times despite separation of the platens.

35. Apparatus as defined in claim 34, wherein the means for maintaining the springs under compression comprises lost motion means connecting the plate member and the said one platen and maintained under tension by the compression of the springs.

36. Apparatus as defined in claim 35, wherein the lost motion connecting means comprises headed rods telescoped within the springs, connected at their lower ends to the said one platen, and having their upper ends extending through holes in the plate member in which they fit loosely with the heads on the rods disposed above the upper surface of the plate member.

37. Apparatus according to claim 32, comprising a plurality of similar aligned platen sets which are spaced uniformly in a longitudinal direction, each platen set being provided with yieldable means placed in compression between the driving means and the one platen of such set, and means rigidly connecting together the ends of the yieldable means connected to the driving means so that they move as a unit when driven by the driving means.

38. Apparatus according to claim 37, comprising a separate driving means for each platen set.

39. Apparatus according to claim 38, wherein the driving means are similar reciprocable fluid motors connected in parallel to the same source of fluid under pressure.

40. Apparatus as defined in claim 39, wherein the fluid motors are disposed with the piston rods vertical, each of the platen sets having a plate member centrally affixed to the outer end of the respective piston rod and disposed in a horizontal plane, a plurality of similar coil compression springs interposed between the plate member and the said one platen and distributed substantially uniformly over the confronting areas of the plate member and the said one platen, and means rigidly connecting the plate members together to be moved as a unit by energization of said fluid motors.

41. In apparatus for baking wafers having a set of parallel horizontal platens which are selectively movable toward each other to form a closed wafer-forming cavity and away from each other to permit the removal of a baked wafer and the charging of batter upon the lower platen, and means to heat the platens to baking temperature, the improvement which comprises stop means acting between the platens along two opposite sides thereof to limit the degree of their approach to each other, said stop means on one platen being in the form of a partial skirt which telescopes over the sides of the other platen and forms substantial closures therewith along said two sides, said stop means comprising a generally right-angled rabbet extending along said two sides of one of the platens, and strip members secured to said two sides of the other platen and extending beyond the cavity bounding surface of the other platen, said strips being accurately received in said rabbets in the one platen when the platens are in the position of closest approach, the free end surfaces of the strip members then engaging the horizontal surfaces of the rabbets.

42. Apparatus according to claim 41, wherein the said one platen is the lower platen, and the other platen is the upper platen.

43. Apparatus according to claim 41, comprising partial skirt means extending along the other two sides of one of the platens and telescoping over the corresponding other two sides of the other platen, the interface between the said telescoped parts along said two other sides presenting cavity venting passages spaced therealong.

44. Apparatus according to claim 43, wherein the partial skirt means on said other two sides is on the upper platen.

45. Apparatus according to claim 44, wherein said venting passages are disposed in the partial skirt and extend vertically downwardly from the edges of the cavity formed between the platens.

46. Wafer-baking apparatus comprising, a platen set comprising upper and lower platens, means holding the lower platen in a fixed position, means selectively to advance the platens relatively to each other to form a wafer-shaping cavity therebetween and to separate the platens to permit the removal of the baked wafer from the cavity, means for heating the platens to predetermined desired baking temperatures, means introducible between the separated platens for grasping a wafer on the lower platen and removing it from between the platens, means automatically actuated after the removal of the baked wafer from the separated platen set to dispense a charge of batter upon the lower platen of the separated platen set, a selectively operated prime mover, linkage means extending between the prime mover and the batter-dispensing, and valve means for selectively operating such last-named means, the valve means comprising an elastomeric valve element which is thrust against the inner end of a batter-dispensing port in a rigid batter-dispensing tube when the valve means is closed, and the valve-operating linkage connected to the valve including a resiliently yieldable lost motion means which permits the valve-operating linkage to move past valve-closed position without overstressing the elastomeric valve element of the valve.

47. Wafer-baking apparatus comprising, a plurality of platen sets disposed in uniformly spaced relationship in a row, each platen set comprising an upper and a lower platen, means holding each of the lower platens in a fixed position, means selectively to advance the platens of each set relatively to each other to form a wafer-shaping cavity therebetween and to separate the platens to permit the removal of the baked wafer from the cavity, means for heating the platens to predetermined desired baking temperatures, means introducible between the separated platens of each set for grasping a wafer on the lower platen and removing it from between the platens, means automatically actuated after the removal of the baked wafers from the separated platen sets to dispense a charge of batter upon each of the lower platens of the separated platen sets, said last-named means comprising a batter carriage reciprocable in a path parallel to the row of platen sets, a plurality of similar batter-dispensing and valve mechanisms mounted on the batter carriage and spaced therealong through the same distances as between the centers of successive platen sets, a selectively operated prime mover mounted on the batter carriage, and linkage means extending between the prime mover and the successive batter-dispensing and valve means for selectively operating such last-named means synchronously and in phase, each of the valve means comprising an elastomeric valve element which is thrust against the inner end of a batter-dispensing port in a rigid batter-dispensing tube when the valve means is closed, the valve-operating linkage connected to each valve including a resiliently yieldable lost motion means which permits the valve-operating linkage to move past valve-closed position without overstressing the elastomeric valve element of any of the valves.

* * * * *